US012651131B2

(12) United States Patent
Henry

(10) Patent No.: US 12,651,131 B2
(45) Date of Patent: Jun. 9, 2026

(54) COMMUNICATING ASSET TAGS, DISPENSING ENCLOSURES AND ASSET MONITORING DEVICES

(71) Applicant: INVENTOR-E LIMITED, Solihull (GB)

(72) Inventor: Dean Charles Henry, Solihull (GB)

(73) Assignee: INVENTOR-E LIMITED, Solihull (GB)

( * ) Notice: Subject to any disclaimer, the term of this patent is extended or adjusted under 35 U.S.C. 154(b) by 0 days.

(21) Appl. No.: 18/113,714

(22) Filed: Feb. 24, 2023

(65) Prior Publication Data

US 2023/0281405 A1 Sep. 7, 2023

(30) Foreign Application Priority Data

Feb. 23, 2022 (GB) ...................................... 2202511
Feb. 24, 2022 (GB) ...................................... 2202585

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ........................ G06K 7/10366; G06K 19/0723
(Continued)

(56) References Cited

U.S. PATENT DOCUMENTS 5,051,601 A * 9/1991 Atobe ................ H04B 10/1143
398/115
5,804,810 A 9/1998 Woolley
(Continued)

FOREIGN PATENT DOCUMENTS

CA 2 829 535 A1 4/2015
CN 106979814 A 7/2017
(Continued)

OTHER PUBLICATIONS

Office Action dated Jul. 14, 2023, corresponding to Great Britain Patent Application No. GB2302652.9.
(Continued)

*Primary Examiner* — Kam Wan Ma
(74) *Attorney, Agent, or Firm* — SQUIRE PATTON BOGGS (US) LLP

(57) ABSTRACT

An asset tag comprises a first short-range wireless interface configured to transmit a wireless signal with a predetermined periodicity, the wireless signals including a tag ID unique to the asset tag, and an optical sensor. The asset tag can include processing circuitry, coupled to the first short-range wireless interface and to the optical sensor and a battery connected to an powering the first short-range wireless interface, optical sensor, and/or processing circuitry. The processing circuitry receives a first electrical signal from the optical sensor in response to the receipt of a first optical signal. The processing circuitry transmits first wireless signals including the tag ID via the first short-range wireless interface. A dispensing enclosure transmits the first optical signal for the or each asset within the dispensing enclosure, receives a respective first wireless signal and determines a set of Tag IDs of assets added or removed by user.

4 Claims, 25 Drawing Sheets

(58) Field of Classification Search
USPC ....................................................... 340/10.1
See application file for complete search history.

(56) References Cited

U.S. PATENT DOCUMENTS

| | | | |
|---|---|---|---|
| 5,874,724 | A | 2/1999 | Cato |
| 5,892,441 | A | 4/1999 | Woolley |
| 5,917,433 | A | 6/1999 | Keillor |
| 7,027,808 | B2 | 4/2006 | Wesby |
| 8,219,466 | B2 | 7/2012 | Gui |
| 8,442,878 | B2 | 5/2013 | Henry |
| 9,109,943 | B2 | 8/2015 | Mager |
| 11,526,843 | B2 | 12/2022 | Li et al. |
| 12,140,467 | B2 | 11/2024 | Henry |
| 2005/0206503 | A1 | 9/2005 | Corrado et al. |
| 2006/0022827 | A1 | 2/2006 | Higham |
| 2007/0040683 | A1 | 2/2007 | Oliver et al. |
| 2007/0050271 | A1 | 3/2007 | Ufford |
| 2007/0050315 | A1 | 3/2007 | Rabindran |
| 2008/0105469 | A1 | 5/2008 | Domel |
| 2009/0102665 | A1* | 4/2009 | Baranowski ....... G08B 13/2448 340/572.8 |
| 2010/0156640 | A1 | 6/2010 | Forster |
| 2010/0327001 | A1 | 12/2010 | Godlewski |
| 2011/0301749 | A1 | 12/2011 | Hammonds et al. |
| 2013/0033381 | A1* | 2/2013 | Breed ................ G08B 13/2417 340/568.1 |
| 2013/0218511 | A1 | 8/2013 | Mager et al. |
| 2014/0246918 | A1 | 9/2014 | Shijo et al. |
| 2014/0262918 | A1 | 9/2014 | Chu |
| 2016/0025549 | A1 | 1/2016 | Motoyama |
| 2016/0071052 | A1 | 3/2016 | Henry et al. |
| 2016/0188838 | A1 | 6/2016 | Bradley et al. |
| 2017/0200275 | A1 | 7/2017 | McCloskey et al. |
| 2018/0309935 | A1 | 10/2018 | Bashkin |
| 2018/0372398 | A1 | 12/2018 | Cosgrove et al. |
| 2019/0301923 | A1 | 10/2019 | Barreto et al. |
| 2019/0307648 | A1 | 10/2019 | Bartos |
| 2019/0354734 | A1* | 11/2019 | Forster ............... G06K 19/0704 |
| 2020/0065748 | A1 | 2/2020 | Durkee et al. |
| 2020/0410433 | A1 | 12/2020 | Rahilly et al. |
| 2021/0160241 | A1* | 5/2021 | Andreev ............... H04L 63/062 |
| 2021/0201256 | A1 | 7/2021 | Rahilly et al. |
| 2021/0351490 | A1 | 11/2021 | Leitermann et al. |
| 2021/0383637 | A1 | 12/2021 | Wang et al. |
| 2022/0101296 | A1 | 3/2022 | Nakamura et al. |
| 2023/0377083 | A1 | 11/2023 | Lowry et al. |
| 2024/0003735 | A1 | 1/2024 | Giloley |
| 2025/0218237 | A1 | 7/2025 | Coelho Pinto et al. |

FOREIGN PATENT DOCUMENTS

| | | | | |
|---|---|---|---|---|
| CN | 111143152 | A | 5/2020 | |
| CN | 210836378 | U | 6/2020 | |
| CN | 111397710 | A | 7/2020 | |
| EP | 2 315 162 | A1 | 4/2011 | |
| EP | 2 819 072 | A1 | 12/2014 | |
| EP | 3 333 776 | A1 | 6/2018 | |
| EP | 4 290 410 | A2 | 12/2023 | |
| GB | 2529906 | A | 3/2016 | |
| GB | 2567336 | A | 10/2019 | |
| GB | 2579941 | A * | 7/2020 | ......... G06K 19/0724 |
| GB | 2600522 | A | 5/2022 | |
| GB | 2610904 | A | 3/2023 | |
| GB | 2616732 | A | 9/2023 | |
| JP | 2008191888 | A | 8/2008 | |
| TW | 201250610 | A1 | 12/2012 | |
| WO | 2006/116665 | A1 | 11/2006 | |
| WO | 2007/128572 | A1 | 11/2007 | |
| WO | 2017/156619 | A1 | 9/2017 | |
| WO | 2017/211708 | A1 | 12/2017 | |

OTHER PUBLICATIONS

Combined Search and Examination Report under Sections 17 and 18(3) dated Aug. 21, 2023 corresponding to Application No. GB2302672.7.

Combined Search and Examination Report under Sections 17 and 18(3) dated Aug. 25, 2023 corresponding to Application No. GB2302680.0.

Office Action dated Nov. 21, 2023 corresponding to Canadian Patent Application No. 3,128,832.

Office Action dated Jan. 27, 2023, corresponding to Canadian Patent Application No. 3,128,832.

Office Action dated Nov. 21, 2022, corresponding to Great Britain Patent Application No. GB2112147.0.

Extended European Search Report dated Jan. 11, 2022 corresponding to European Patent Application No. 21020425.1.

Combined Search and Examination Report under Sections 17 and 18(3) dated Feb. 22, 2022 corresponding to GB Application No. GB2112145.4.

Combined Search and Examination Report under Sections 17 and 18(3) dated Feb. 24, 2022 corresponding to GB Application No. GB2112147.0.

Combined Search and Examination Report under Sections 17 and 18(3) dated Feb. 22, 2022 corresponding to GB Application No. GB2112148.8.

Combined Search and Examination Report under Sections 17 and 18(3) dated Feb. 25, 2022 corresponding to GB Application No. GB2112151.2.

Combined Search and Examination Report under Sections 17 and 18(3) dated Feb. 28, 2022 corresponding to GB Application No. GB2112153.8.

Office Action dated Oct. 2, 2023, corresponding to GB Application No. GB2310604.0.

Communication pursuant to Article 94(3) EPC dated Aug. 8, 2023, corresponding to European Patent Application No. 21020425.1.

Extended European Search Report dated Jan. 9, 2024, corresponding to European Patent Application No. 23020089.1.

Office Action dated Feb. 15, 2024, corresponding to U.S. Appl. No. 17/410,568.

Extended European Search Report dated Jul. 13, 2023, corresponding to European Patent Application No. 23020094.1.

Communication pursuant to Article 94(3) EPC dated Jul. 15, 2024, corresponding to European Patent Application No. 23 020 094.1.

Examination Report under Section 18(3) dated Sep. 18, 2024 corresponding to United Kingdom Patent Application No. GB2302652.9.

Examination Report under Section 18(3) dated Oct. 1, 2024, corresponding to GB Patent Application No. GB2310604.0.

British Combined Search and Examination Report under Sections 17 and 18(3), corresponding to GB Application No. GB2502406.8, dated Mar. 26, 2025.

British Examination Report corresponding to GB Application No. GB2302652.9, dated Jul. 28, 2025.

Examination Report under Section 18(3) dated Oct. 17, 2024 corresponding to United Kingdom Patent Application No. GB2302702.2.

U.S. Office Action, corresponding to co-pending U.S. Appl. No. 18/113,705, dated Sep. 16, 2025.

Communication pursuant to Article 94(3) EPC dated Aug. 20, 2025 corresponding to European Patent Application No. 21020425.1.

Examination Report under Section 18(3) dated Nov. 28, 2025 corresponding to United Kingdom Patent Application No. 2302653.7.

Examination Report under Section 18(3) dated Nov. 28, 2025 corresponding to United Kingdom Patent Application No. 2302680.0.

Examination Report under Section 18(3) dated Nov. 24, 2025 corresponding to United Kingdom Patent Application No. 2302716.2.

Combined Search and Examination Report under Sections 17 & 18(3) dated Jan. 27, 2026 corresponding to United Kingdom Patent Application No. 2522699.4.

(56) References Cited

OTHER PUBLICATIONS

US Office Action corresponding to U.S. Appl. No. 18/113,705,
dated Apr. 13, 2026.

* cited by examiner

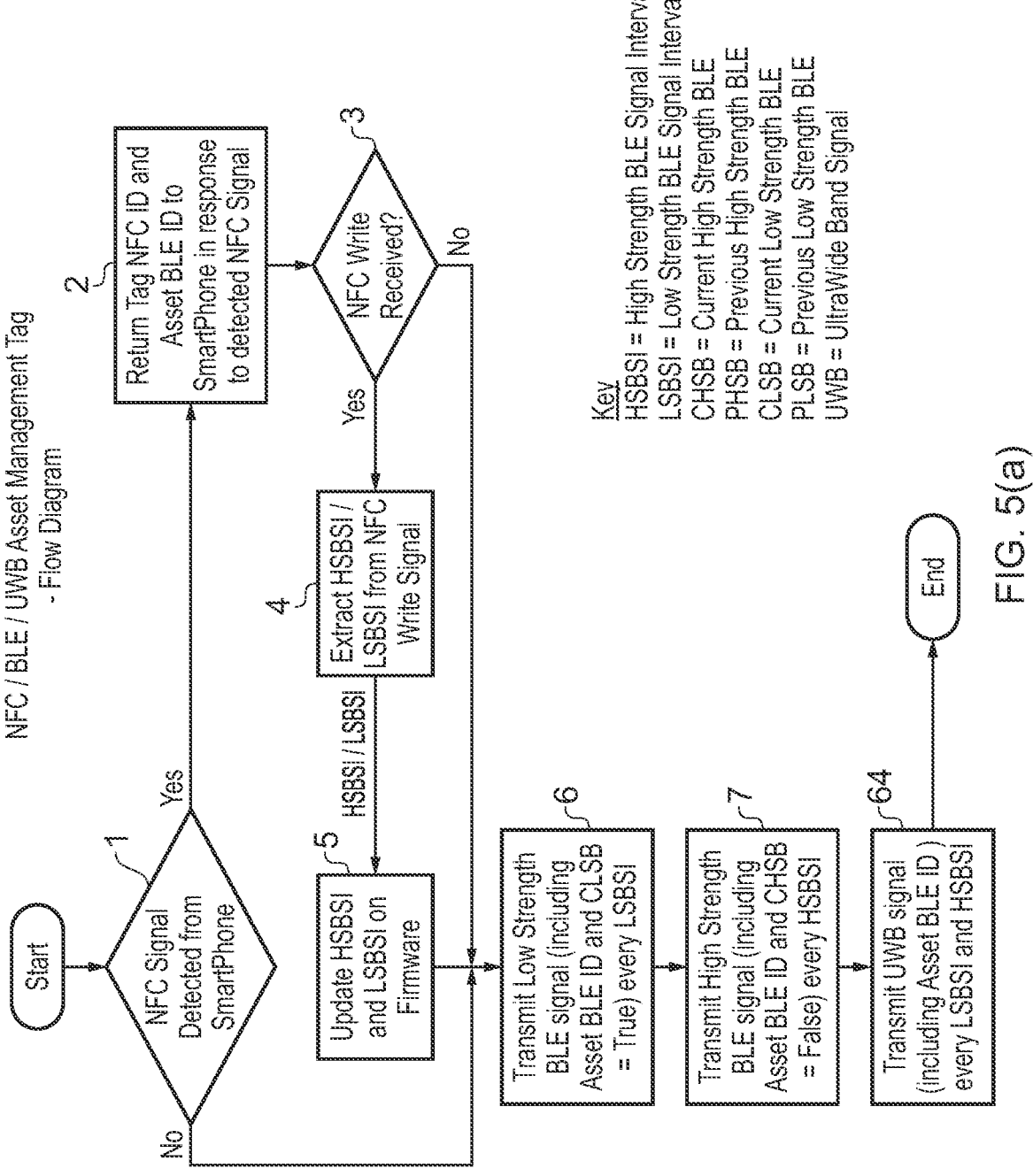

NFC / BLE / UWB Asset Management Tag
- Flow Diagram

Start

1 — NFC Signal Detected from SmartPhone

Yes

2 — Return Tag NFC ID and Asset BLE ID to SmartPhone in response to detected NFC Signal 3 — NFC Write Received?

Yes

4 — Extract HSBSI / LSBSI from NFC Write Signal

HSBSI / LSBSI

No

5 — Update HSBSI and LSBSI on Firmware

6 — Transmit Low Strength BLE signal (including Asset BLE ID and CLSB = True) every LSBSI 7 — Transmit High Strength BLE signal (including Asset BLE ID and CHSB = False) every HSBSI 64 — Transmit UWB signal (including Asset BLE ID) every LSBSI and HSBSI End Key
HSBSI = High Strength BLE Signal Interval
LSBSI = Low Strength BLE Signal Interval
CHSB = Current High Strength BLE
PHSB = Previous High Strength BLE
CLSB = Current Low Strength BLE
PLSB = Previous Low Strength BLE
UWB = UltraWide Band Signal

FIG. 5(a)

Cabinet Controller

Start

8 — For each received BLE signal, extract Asset BLE ID and CHSB/CLSB/Status alterntively UWB Key
CHSB = Current High Strength BLE
PHSB = Previous High Strength BLE
CLSB = Current Low Strength BLE
PLSB = Previous Low Strength BLE
UWB = UltrawideBand Signal
CUWB = Current Ultrawide Band (Distance = Integer)
UWBD = Distance at which UWB integer is considered
CLSB = True)

65 — Was UWB Received?    No

Yes

71 — Calculate Distance to Tag using UWB and Assign to CUWB

CUWB = Integer

66

Perform algorithm comparing CUWB and UWBD from UWBD Database to determine if CLSB = True / False or CHSB = True / False UWBD = Integer    67 — UWBD Database CUWB > UWBD    Compare CUWB and UWBD    CUWB < UWBD

68

Set Extracted CLSB = False CHSB = True — 69

Set Extracted CLSB = True CHSB = False — 70

Repeated Check

9 — Store in [Asset Location Database], in association with the extracted Asset BLE ID, the corresponding extracted CHSB and/or CLSB statuses and CUWB Distance Asset BLE ID
CHSB = True / False
CLSB = True / False
CUWB = Integer Asset Location Database

10

11 — If Asset BLE ID is listed on Asset Location Database and there is no Asset BLE ID broadcast set CHSB = False and CLSB = False Asset BLE ID Asset BLE ID
CHSB = False
CLSB = False Asset Location Database

GATEWAY 108

Key
CHSB = Current High Strength BLE
CLSB = Current Low Strength BLE
UWB = UltrawideBand Signal
CUWB = Current Tag UltrawideBand
Distance from Gateway Central Controlling Computer Process 116

1. Door Closed
   Entry by access control

2. Door Open
   Removal of Asset see Fig. 10
Activity of and
monitoring of the
asset tag outside
the cabinet 3. Door Closed
   Method by which the
cabinet determines
presencec/absence of asset see Fig. 8
IR LED etc.

4. Door Open
   via access control
Asset returned

5. Door Closed
   Stage 3 repeated

A. IR LED
   Flashes a signal (6
   flashes)

B. Received by IR
   Diode on Asset Tag

C. Asset Tag
   Broadcasts
   presence to
   internal gateway

Figure 9:
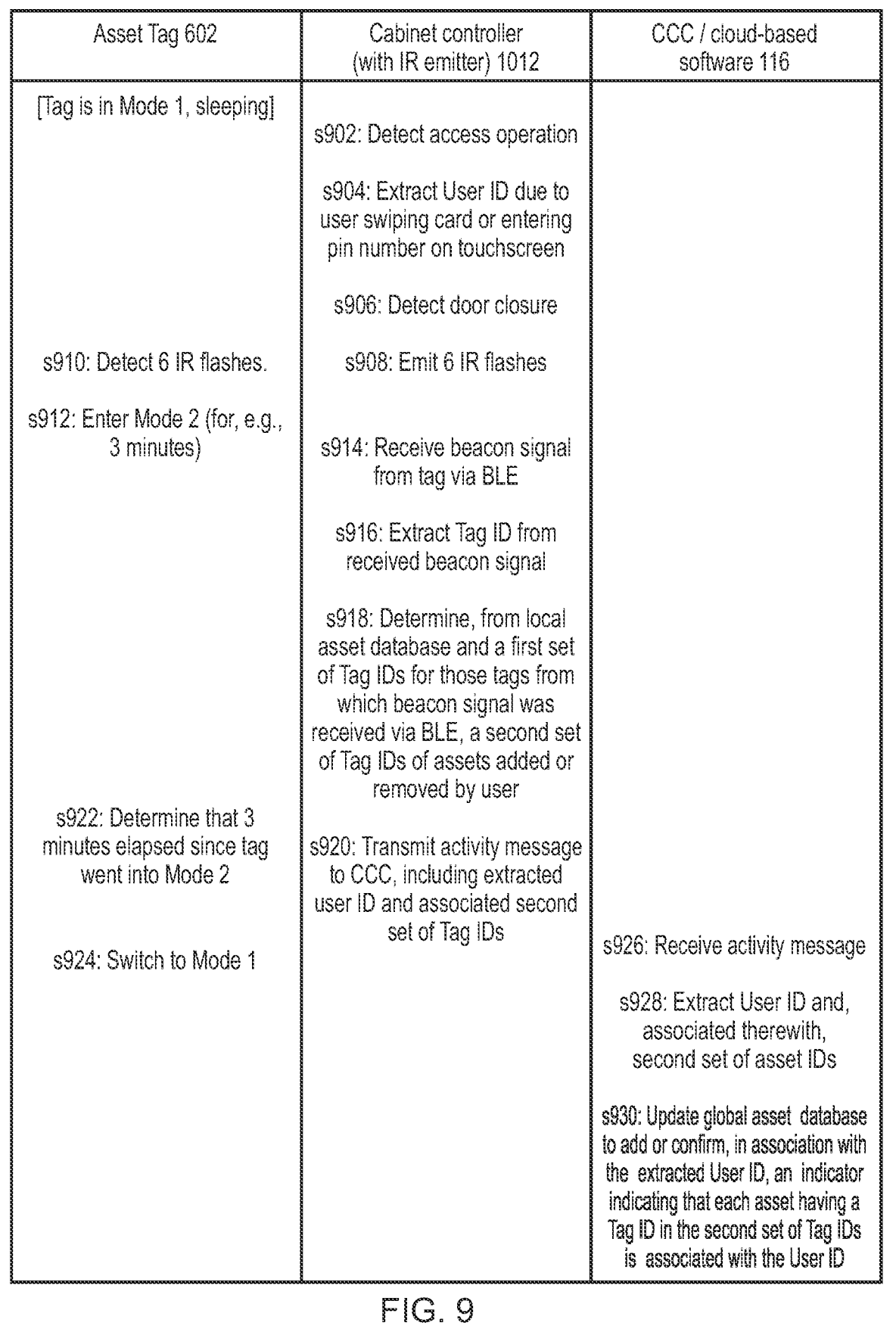

| Asset Tag 602 | Cabinet controller (with IR emitter) 1012 | CCC / cloud-based software 116 |
|---|---|---|
| [Tag is in Mode 1, sleeping] | s902: Detect access operation | |
| | s904: Extract User ID due to user swiping card or entering pin number on touchscreen | |
| | s906: Detect door closure | |
| s910: Detect 6 IR flashes. | s908: Emit 6 IR flashes | |
| s912: Enter Mode 2 (for, e.g., 3 minutes) | s914: Receive beacon signal from tag via BLE | |
| | s916: Extract Tag ID from received beacon signal | |
| | s918: Determine, from local asset database and a first set of Tag IDs for those tags from which beacon signal was received via BLE, a second set of Tag IDs of assets added or removed by user | |
| s922: Determine that 3 minutes elapsed since tag went into Mode 2 | s920: Transmit activity message to CCC, including extracted user ID and associated second set of Tag IDs | |
| s924: Switch to Mode 1 | | s926: Receive activity message |
| | | s928: Extract User ID and, associated therewith, second set of asset IDs |
| | | s930: Update global asset database to add or confirm, in association with the extracted User ID, an indicator indicating that each asset having a Tag ID in the second set of Tag IDs is associated with the User ID |

Aerial

A

DIODE   410

402

Processor
CPU/RAM

B

UWB   412

BLE

406

C

Accelerometer   414

413

D

Variable
Beaconing
(VBS/VBR)

A B + C are all methods of knowing where the asset is
A. Diode, if bleached, not in the cabinet
B. UWB
C. Accelerometer - if on the move, not in cabinet

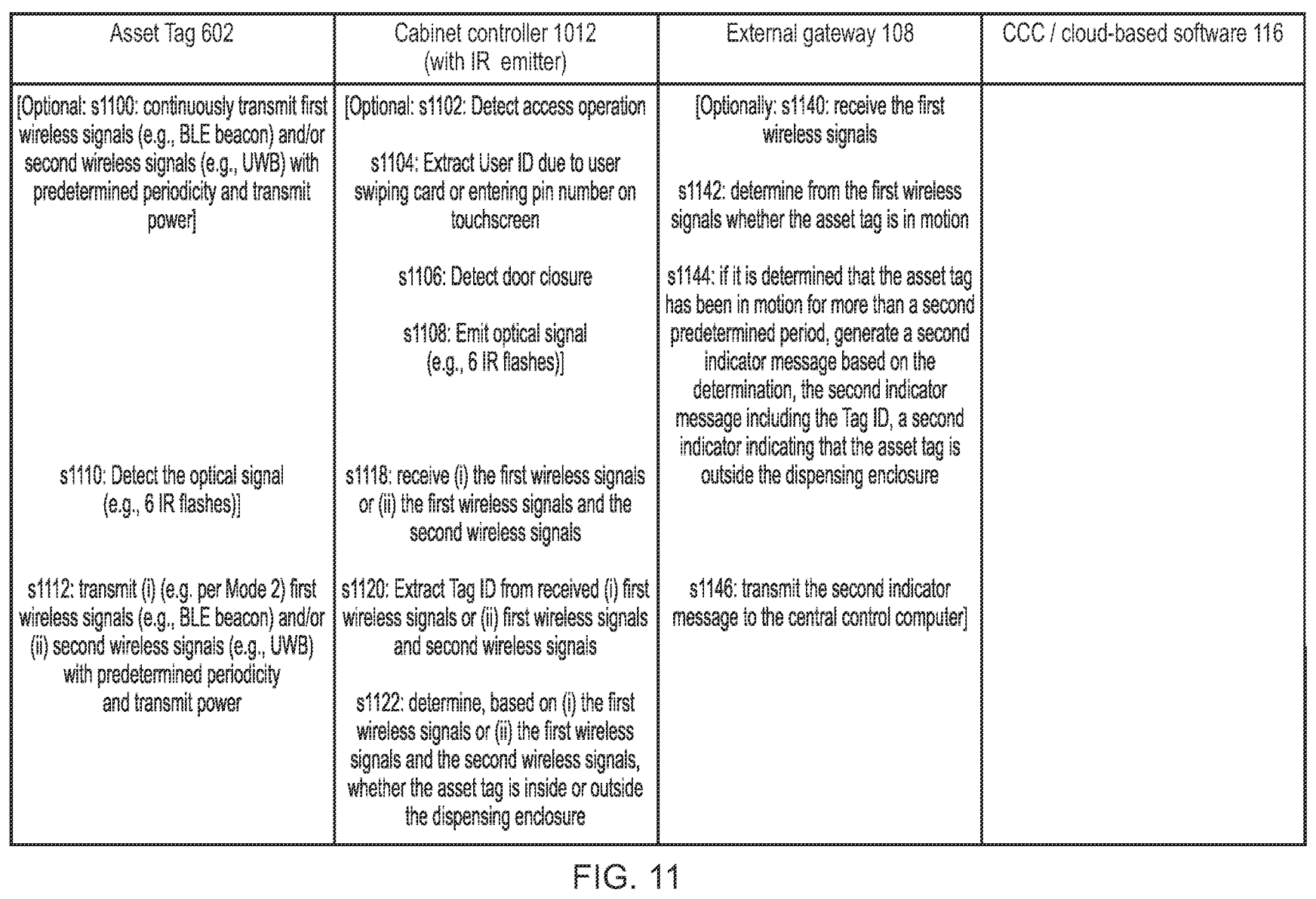

| Asset Tag 602 | Cabinet controller 1012 (with IR emitter) | External gateway 108 | CCC / cloud-based software 116 |
|---|---|---|---|
| [Optional: s1100: continuously transmit first wireless signals (e.g., BLE beacon) and/or second wireless signals (e.g., UWB) with predetermined periodicity and transmit power] | [Optional: s1102: Detect access operation<br><br>s1104: Extract User ID due to user swiping card or entering pin number on touchscreen<br><br>s1106: Detect door closure<br><br>s1108: Emit optical signal (e.g., 6 IR flashes)] | [Optionally: s1140: receive the first wireless signals<br><br>s1142: determine from the first wireless signals whether the asset tag is in motion<br><br>s1144: if it is determined that the asset tag has been in motion for more than a second predetermined period, generate a second indicator message based on the determination, the second indicator message including the Tag ID, a second indicator indicating that the asset tag is outside the dispensing enclosure<br><br>s1146: transmit the second indicator message to the central control computer] | |
| s1110: Detect the optical signal (e.g., 6 IR flashes)] | s1118: receive (i) the first wireless signals or (ii) the first wireless signals and the second wireless signals | | |
| s1112: transmit (i) (e.g., per Mode 2) first wireless signals (e.g., BLE beacon) and/or (ii) second wireless signals (e.g., UWB) with predetermined periodicity and transmit power | s1120: Extract Tag ID from received (i) first wireless signals or (ii) first wireless signals and second wireless signals<br><br>s1122: determine, based on (i) the first wireless signals or (ii) the first wireless signals and the second wireless signals, whether the asset tag is inside or outside the dispensing enclosure | | |

FIG. 11

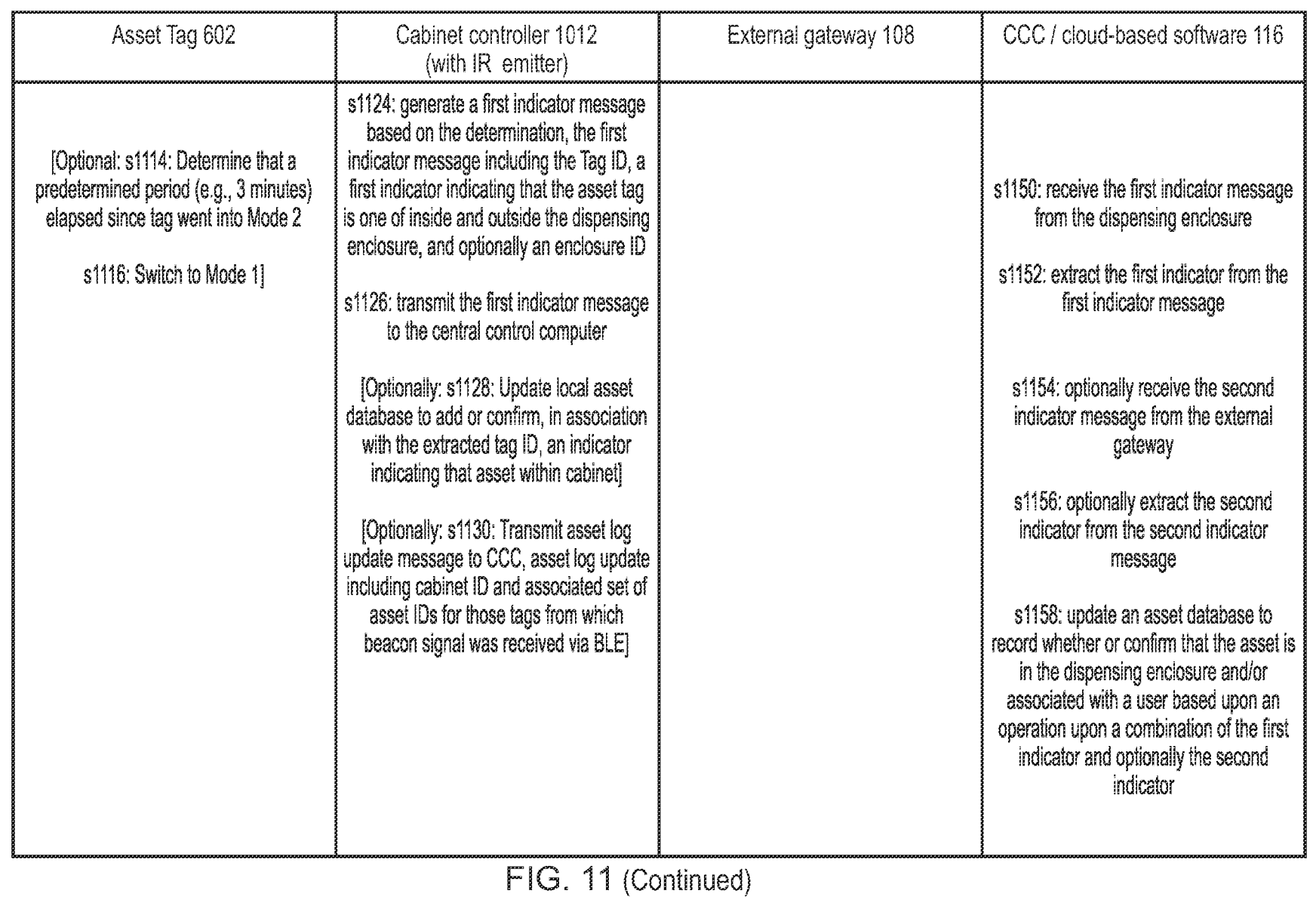

| Asset Tag 602 | Cabinet controller 1012 (with IR emitter) | External gateway 108 | CCC / cloud-based software 116 |
|---|---|---|---|
| [Optional: s1114: Determine that a predetermined period (e.g., 3 minutes) elapsed since tag went into Mode 2]  s1116: Switch to Mode 1] | s1124: generate a first indicator message based on the determination, the first indicator message including the Tag ID, a first indicator indicating that the asset tag is one of inside and outside the dispensing enclosure, and optionally an enclosure ID  s1126: transmit the first indicator message to the central control computer  [Optionally: s1128: Update local asset database to add or confirm, in association with the extracted tag ID, an indicator indicating that asset within cabinet]  [Optionally: s1130: Transmit asset log update message to CCC, asset log update including cabinet ID and associated set of asset IDs for those tags from which beacon signal was received via BLE] | | s1150: receive the first indicator message from the dispensing enclosure  s1152: extract the first indicator from the first indicator message  s1154: optionally receive the second indicator message from the external gateway  s1156: optionally extract the second indicator from the second indicator message  s1158: update an asset database to record whether or confirm that the asset is in the dispensing enclosure and/or associated with a user based upon an operation upon a combination of the first indicator and optionally the second indicator |

FIG. 11 (Continued)

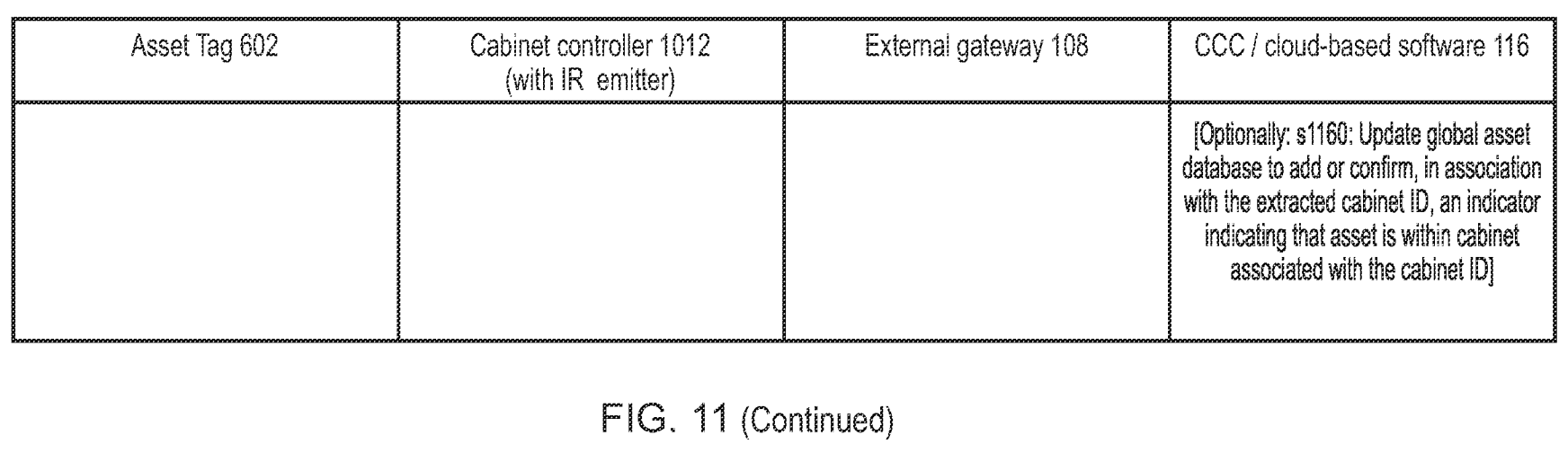

| Asset Tag 602 | Cabinet controller 1012 (with IR emitter) | External gateway 108 | CCC / cloud-based software 116 |
|---|---|---|---|
| | | | [Optionally: s1160: Update global asset database to add or confirm, in association with the extracted cabinet ID, an indicator indicating that asset is within cabinet associated with the cabinet ID] |

FIG. 11 (Continued)

COMMUNICATING ASSET TAGS, DISPENSING ENCLOSURES AND ASSET MONITORING DEVICES

The present invention relates to electronic stock or asset monitoring techniques, and more particularly to asset tags, dispensing enclosures and asset monitoring devices and systems.

It is known to provide for dispensing and return of assets or stock items from containers such as bins, from dispensing cabinets (which may be secure/lockable), and from bins contained within such cabinets. Such devices may be found in factories or production sites or any environment in which is desirable to know at a given time the location of an asset or stock item.

Accurate monitoring of assets (including date and time of issuance/return, by specific user and location of dispensing cabinets that the assets have been issued/returned from) is paramount in certain settings, such as manufacturing and distribution businesses and hospitals. Assets may be placed in a lockable and secure cabinet, allowing users pick, choose and scan/record which assets they wish to take/return. However, this is a lengthy and honour-based process, and many users do not have the time or the inclination to follow the methodology. There is also no guarantee that the user will scan/record the item they have taken.

There is a need for improved arrangements whereby asset tags, dispensing units and dispensing cabinets, and systems employing these, facilitate recording of the assets removed by, or returned by, a user. There additionally is a need for enhanced techniques for detecting and/or monitoring the location of an asset.

BRIEF SUMMARY

In one aspect, there is provided an asset tag adapted to be mounted to an asset, the asset tag comprising: a first short-range wireless interface configured to transmit a wireless signal with a predetermined periodicity, the wireless signals including a tag ID unique to the asset tag; an optical sensor configured to receive optical signals and output electrical signals; processing circuitry, coupled to the first short-range wireless interface and to the optical sensor; a battery, wherein the first short-range wireless interface, optical sensor, and/or processing circuitry are connected to and powered by the battery; wherein the processing circuitry is configured to receive a first electrical signal from the optical sensor in response to the receipt thereby of a first optical signal; in response to the first electrical signal, transmits first wireless signals including the tag ID via the first short-range wireless interface.

In an embodiment, the first optical signal comprises a plurality of pulses.

In an embodiment, the first optical signal comprises N pulses, where N is (i) in the range 2-8 or (ii) is 6.

In an embodiment, the processing circuitry is configured to operate the asset tag, at a given time, in one of at least two modes, the least two modes comprising (i) a sleep mode in which the first short-range wireless interface is off, preferably such that the asset tag consumes low power and (ii) a first transmit mode in which the first short-range wireless transmits first wireless signals with a first transmit power and optionally a first periodicity, such that the power consumed by the asset tag is lower in the first transmit mode than in the sleep mode. In an embodiment, the processing circuitry is configured to: in response to the first electrical signal, switch from the sleep mode to the first transmit mode, in which the first wireless signals are transmitted; determine whether a first predetermined period has elapsed since the last switch from the sleep mode to the first transmit mode; and in response to determining that the first predetermined period has elapsed since the last switch from the sleep mode to the first transmit mode, switch from the first transmit mode to the sleep mode.

In an embodiment, the at least two modes further include (iii) a second transmit mode in which the first short-range wireless transmits second wireless signals with a second transmit power optionally equal to the first transmit power and optionally with the first periodicity and/or indefinitely, such that the power consumed by the asset tag is lower in the sleep mode than in the second transmit mode.

In an embodiment, the at least two modes further include (iv) a third transmit mode in which the first short-range wireless transmits third wireless signals with a third transmit power and optionally with a second periodicity and/or indefinitely, such that the power consumed by the asset tag is lower in the first and/or second transmit mode than in the third transmit mode.

In another aspect, there is provided a dispensing enclosure, the dispensing enclosure comprising: a housing; one or more assets disposed within the housing, the or each asset having an asset tag mounted thereon; an access control device configured to receive a User ID through a user's authorised access to the dispensing enclosure using the access control device; a door mounted on the housing, whereby the door is openable and closable by a user; a door sensor configured to output a door close signal in the event of the door transitioning from open to closed and optionally a door open signal in the event of the door transitioning from closed to open; an optical transmitter configured to transmit optical signals; a second short-range wireless interface; and a controller, the controller being connected to the door sensor, to the optical transmitter, and to the second short-range wireless interface; wherein the controller is configured to receive the door close signal; in response to the door close signal, transmit the first optical signal using the optical transmitter; for the or each asset within the dispensing enclosure, receive a respective first wireless signal from the via the second short-range wireless interface; extract the Tag ID from each received first wireless signal; determine, based on the extracted Tag IDs, a set of Tag IDs of assets added or removed by user; transmit an activity message to a remote central control computer, the activity message including the extracted user ID and, associated therewith, the set of Tag IDs.

In an embodiment, to determine, based on the extracted Tag IDs, a set of Tag IDs of assets added or removed by user, the controller is configured to determine, from a third set of Tag IDs stored in a local asset database and a first set of Tag IDs comprising the extracted Tag IDs, the difference therebetween as a second set of Tag IDs. In an embodiment the set of Tag IDs in the activity message comprises the second set of Tag IDs.

Embodiments of the invention will now be described in detail, by way of example, with reference to the accompanying drawings, in which:

BRIEF DESCRIPTION OF THE DRAWINGS

FIG. 9 shows the operations performed at the asset tag 602, cabinet controller 1012 (R-Pi)—Gateway and central control computer (cloud-based software) 116 in the process of FIG. 8 for determining assets removed from or added to a cabinet by a user, in an embodiment;

FIG. 10 schematically shows various techniques that may be used in monitoring activity and/or location of the asset tag of FIGS. 4(*a*) and 4(*b*) outside the cabinet of FIGS. 2(*a*) to 2(*h*) after removal by a user, in an embodiment; and.

FIG. 11 is a flow chart of operations at an asset tag 602, a Cabinet controller 1012, an External gateway 108 and the CCC/cloud-based software 116 determining whether an asset is within or outside a dispensing enclosure 1000, an optionally tracking its location outside, in an embodiment.

DETAILED DESCRIPTION

In the following, like numerals will be used to denote like elements. Unless indicated otherwise, any individual design features, components or steps mentioned herein (e.g., in relation to one embodiment) may be used in combination with any other features, components or steps disclosed herein (e.g., in relation to one or more other embodiments).

Embodiments of this disclosure concern systems and methods for providing monitoring of quantities of stock or assets in an accurate and preferably secure manner, in storage environments where hand-portable stock items can be stored and accessed by a user or, more typically, a multitude of different users or employees. Such storage environments are typically found at manufacturing, construction, aerospace, healthcare and other sites. The assets may include tools, consumable materials, and single-use and reusable items. As used herein, "stock item", "item", "product" and "asset" may be used interchangeably; and assets may be referred to generally as "indirect materials" or "inventory".

However, it will be appreciated that techniques according to embodiments of this disclosure may be used in other settings and for other purposes, such where it is desirable to detect conditions or take measurements relating to objects or attributes of the objects, e.g., temperature and pressure sensing, or in the monitoring of the presence or absence of objects or persons.

As noted, in the case of monitoring of quantities of stock or assets, a problem with such systems is that some organisations have thousands of stock items across their sites, accessible via numerous (wired) dispensing units (which are or include bins for the assets) spread across one or multiple locations within a site, and/or across numerous sites, and the process of setting up monitoring and/or tracking of at least removal of stock items by any of numerous users is onerous, inflexible and time consuming.

Figure 1:
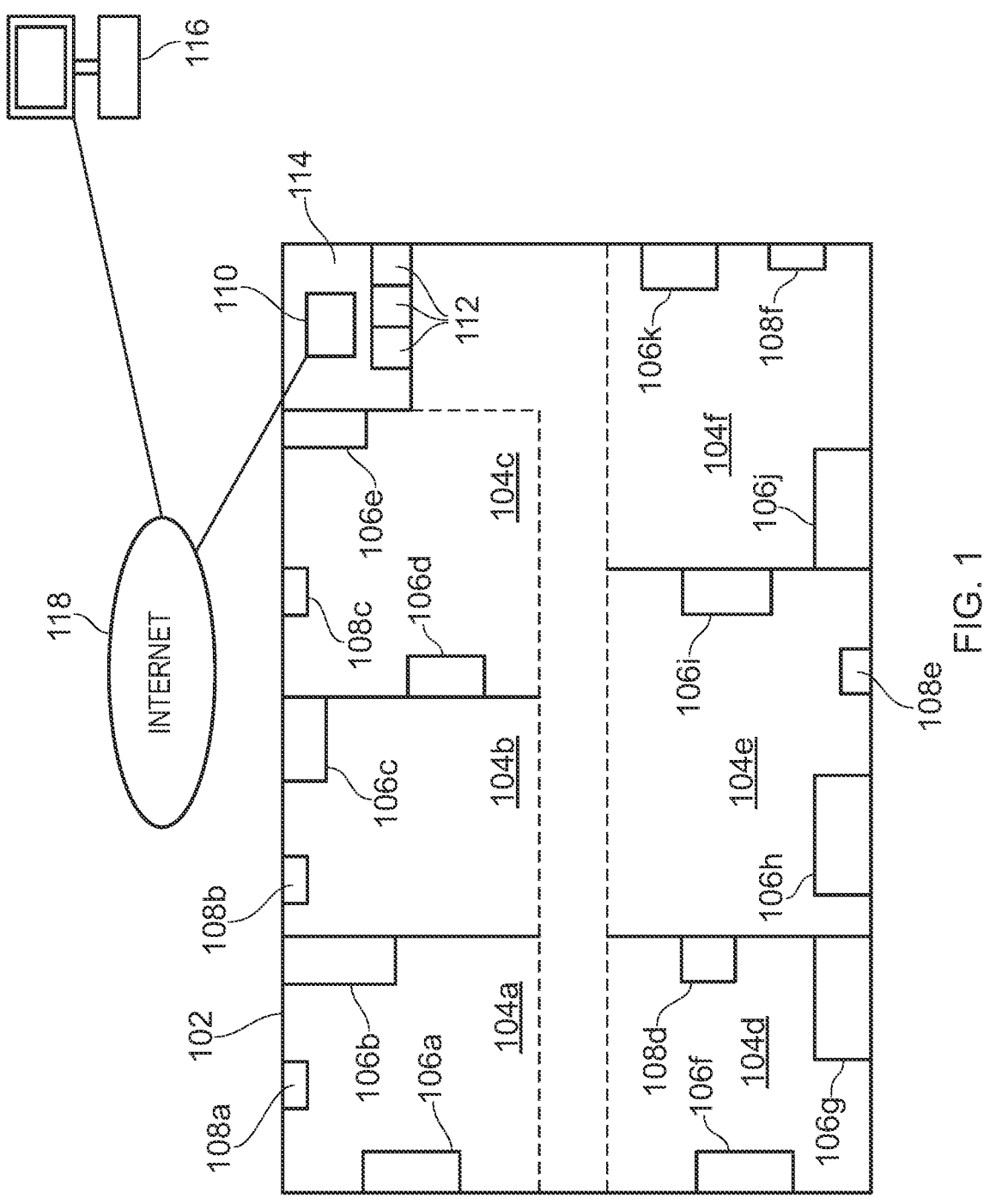
FIG. 1 is a schematic diagram illustrating a distributed stock dispensing, monitoring and/or and tracking system in which techniques according to embodiments of this disclosure can be used.

As used herein, "cloud-based software" means specially configured (e.g., server-executed) software running on the central control computer ("CCC") or server 116 (see FIG. 1).

FIG. 1 is a schematic diagram illustrating a distributed stock dispensing and tracking system in which devices and methods according to embodiments of the invention can be used. A manufacturing site or factory 102 may include operational areas 104*a* to 104*f*, in which manufacturing and/or repair operations, for example, may performed, requiring, periodically, supply of stock items (not shown). In each operational area 104*a* to 104*f* may be one or two respective dispensing stations 106*a* to 106*k*. For example, users in operational area 104*a* may obtain stock items from dispensing stations 106*a* and 106*b*, although they may where necessary obtain such items from and of dispensing stations 106*a* to 106*k*. In this disclosure, "dispensing" and "dispensing" are used interchangeably, and "dispensing unit" and "dispensing unit" are used interchangeably. For example, using the latter, an operative (user) may replenish his supplies/stock items for manufacturing/maintenance activity, and the overall system dispenses such supplies/stock items. In this disclosure dispensing stations 106*a* to 106*k* may comprise a dispensing enclosure (cabinet) of FIGS. 2(*a*) to 2(*b*), 2(*c*) or 2(*d*), or 2(*e*) to 2(*g*) discussed hereinbelow.

A respective (external) gateway 108*a* to 108*f* may be provided in each operational area 104*a* to 104*f*; alternatively, one of the gateways 108*a* to 108*f* may serve multiple or all areas operational area 104*a* to 104*f*. In use, dispensing devices (not shown) at the dispensing stations 106*a* to 106*k* communicate wirelessly with a respective, or with one or more, gateways 108*a* to 108*f*, as will be described further below. In this disclosure, "wireless access point" and "gateway" are used interchangeably, and such devices are, in embodiments, to be understood as devices configured to receive signals wirelessly from, and in embodiments transmit signals wirelessly to, first devices (e.g. weight sensor unit as discussed below), and to forward the content of such wireless signals (e.g. as further signals or messages transmitted over a wired or wireless network) to a second device, such as a server, control computer, further gateway, router, etc.

In an embodiment, each gateway 108a to 108f is coupled to router/further gateway 110 and/or local servers 112 in server room 114, e.g., over LAN (not shown). In turn, the router/gateway 110 and/or local servers 112 may communicate with a central computer (central server) 116 via a WAN, e.g., the internet 118. In this disclosure, "central computer", "central control computer", "CCC" and "central server" are used interchangeably to mean the central computer 116 of FIG. 1.

In embodiments, alternatively or additionally one or more of the gateways 108a to 108f comprises a cellular interface (not shown) including or coupled to a cellular antenna (not shown); and, in this manner, one or more of the gateways 108a to 108f may transmit data in signals or messages to central computer (central server) 116 via a cellular network (not shown).

Figure 2A:
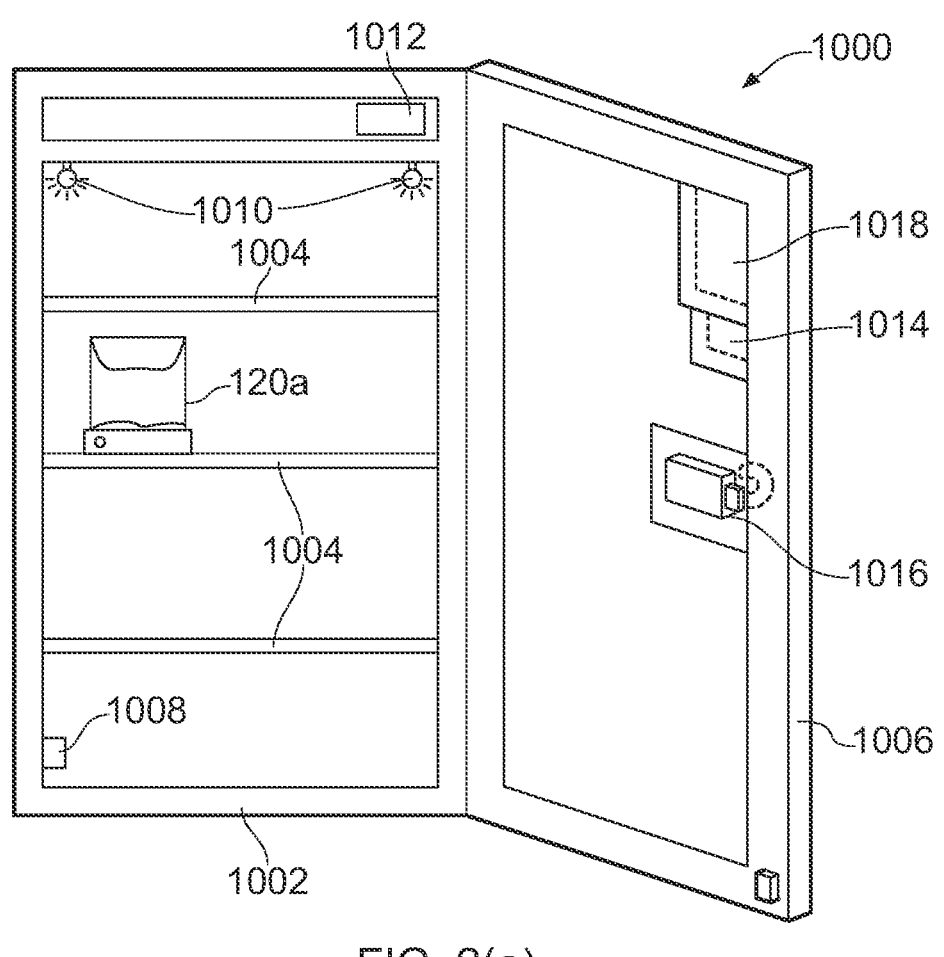
FIG. 2(*a*) is a front view of a dispensing enclosure (cabinet 1000) according to an embodiment, and FIG. 2(*b*) is a schematic block diagram of the internal electronics of the cabinet 1000 of FIG. 2(*a*), in an embodiment, FIG. 2(*c*) is a perspective view of the cabinet 1000 of FIG. 2(*a*), FIG. 2(*d*) is a perspective view of a cabinet 1000 in another embodiment, FIGS. 2(*e*) to 2(*g*) are perspective views of the cabinet 1000' of FIG. 2(*d*) in various states (e.g. open/closed), and FIG. 2(*h*) is a schematic block diagram of the internal electronics of the cabinet 1000 of any of FIGS. 2(*c*) to 2(*h*), in another embodiment.
Figure 2B:
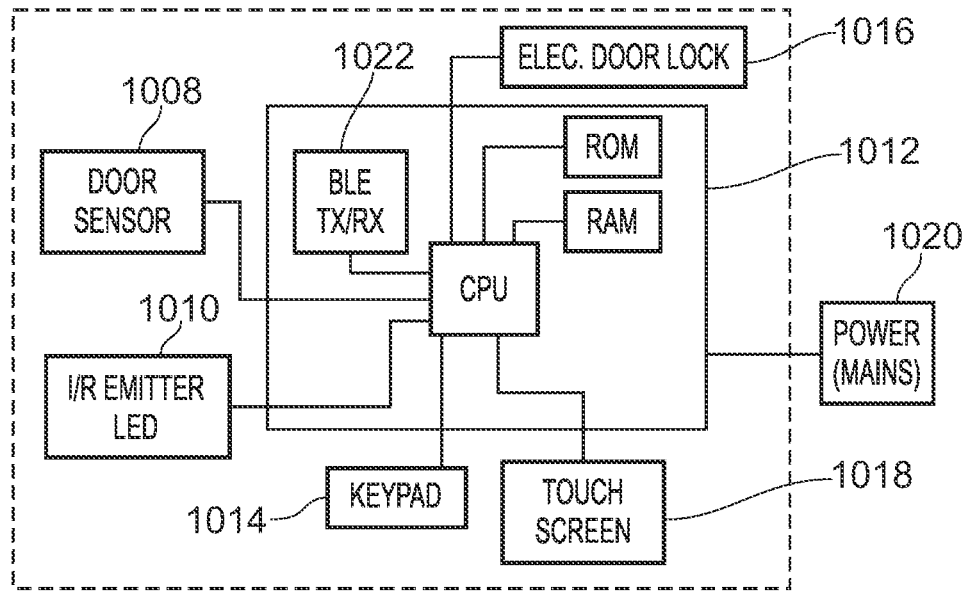
Figures 2C, 2D:
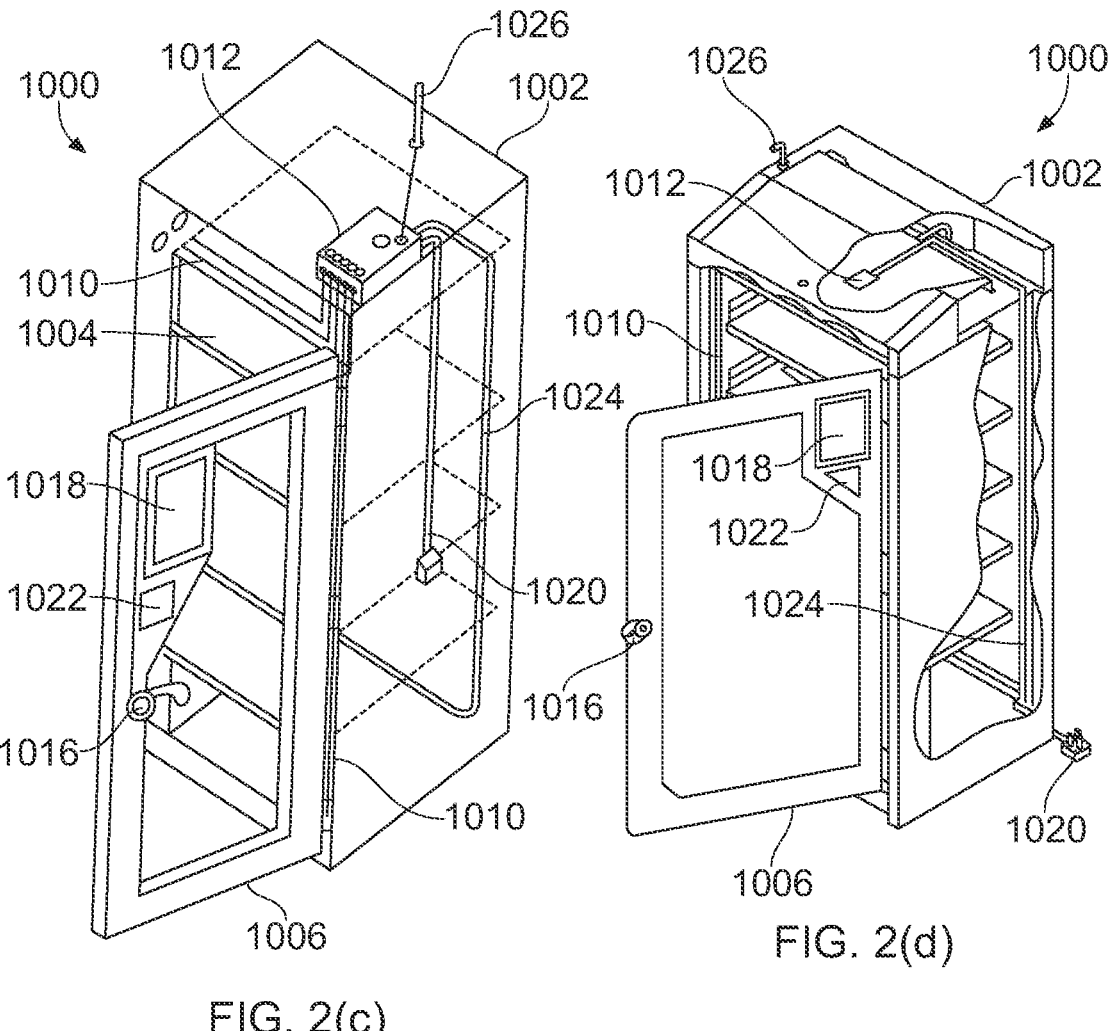

FIG. 2(a) is a front view of a dispensing enclosure (cabinet 1000) according to an embodiment, and FIG. 2(b) is a schematic block diagram of the internal electronics of the cabinet 1000. FIG. 2(c) is a schematic block diagram of the internal electronics of the cabinet 1000 of FIG. 2(a), in another embodiment.

In an embodiment, the cabinet 1000 comprises a housing 1002, one or more shelves 1004 mounted internally within the housing 1002, one or more dispensing units 120a (only one is shown, for illustration). In an embodiment, the cabinet 1000 comprises a door 1006 mounted on the housing 1002, whereby the door is openable and closable by a user, and a door sensor 1008 configured to output a door open signal in the event of the door 1006 transitioning from closed to open and a door close signal in the event of the door 1006 transitioning from open to closed. The door sensor 1008 may take many forms, and may be a magnetic/hall effect sensor; alternatively, it may be embodied in an electronic (controllable) door lock (not shown) connected to a cabinet controller 1012 discussed further below. In an embodiment, the door 1006 is a glazed door incorporating a transparent pane, e.g., which filters, so as to prevent IR light entering the cabinet 1000. In an embodiment, the door 1006 is a solid and/or non-transparent door.

In an embodiment, the cabinet 1000 comprises an optical transmitter 1010 configured to transmit optical signals; the latter may be in elongate form so as to extend within the cabinet, e.g., in an inverted U-shape so as to correspond to 3 panels of the cabinet. In an embodiment, the cabinet 1000 comprises a controller 1012, the controller being connected to the door sensor 1008 and to the optical transmitter 1010. In an embodiment, (i) the optical transmitter 1010 is an infrared (IR) light emitter or (ii) an IR LED.

In an embodiment, the controller 1012 comprises a wireless gateway. In an embodiment, the controller 1012 includes or is connected to a first wireless receiver or first wireless transceiver 1022. In an embodiment, the first wireless receiver or first wireless transceiver 1022 is a Bluetooth Low Energy (BLE) receiver or transceiver, respectively, and the wireless signals are BLE signals.

In an embodiment, the controller includes or is connected to a cellular transceiver or wired network transceiver (not shown).

In an embodiment, the cabinet 1000 further comprises a keypad 1014 for controlling user access, a door lock 1016 and a touchscreen 1018 for user information and/or alternative access control. The cabinet 1000 may be powered by a mains power supply, indicated at 1020. In an embodiment, the controller has a secondary power source, such as a battery or UPS (not shown).

Referring to FIG. 2(c), in embodiment, a card reader 1022 is provided for controlling user access, the card reader 1022 being configured to read a user card presented by the user, and extract therefrom a user ID. Coupled to the controller 1012 may be a leaky wave antenna 1024, for receiving wireless signals from devices within the cabinet. The controller 1012 may communicate wirelessly with a network using a cellular interface (not shown), using cellular antenna 1026. In an embodiment, the secondary power source is a battery.

Figures 2E, 2F, 2G:
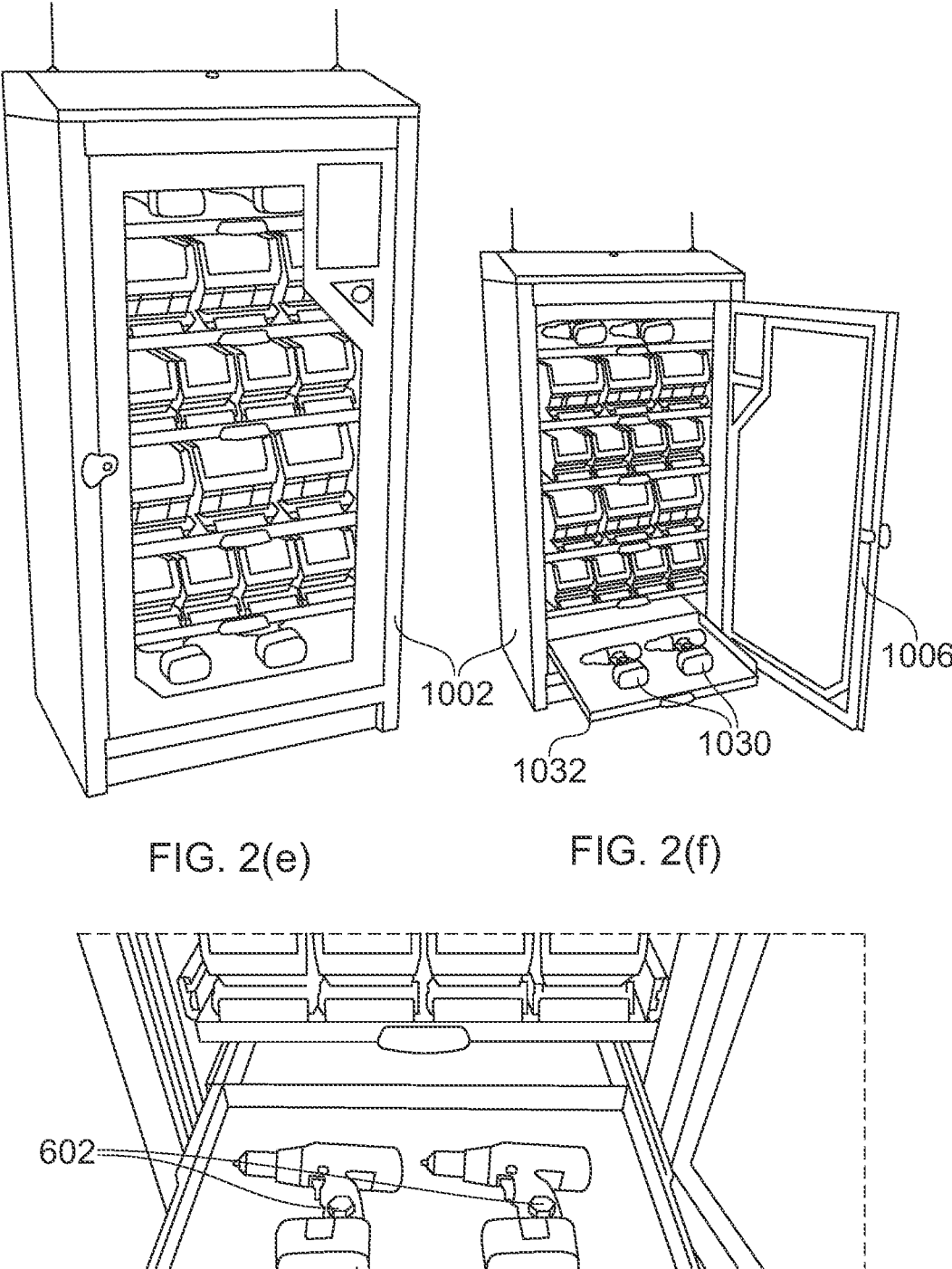

FIGS. 2(e) to 2(g) are perspective views of the cabinet 1000' of FIG. 2(d) in various states (e.g., open/closed). As seen in FIGS. 2(e) and 2(f), assets (e.g., power tools) 1030 may be accessed by a user via pull-out tray 1032 (and thereafter removed). As seen in FIG. 2(g), each asset 1030 may have attached thereto (e.g., by adhesive film) a respective asset tag 602, discussed below with respect to FIG. 4. Each asset tag 602 may have a globally unique tag ID, e.g., provided by an ID of an interface thereof, e.g., a Bluetooth Low Energy (BLE) ID.

Figures 2H, 3:
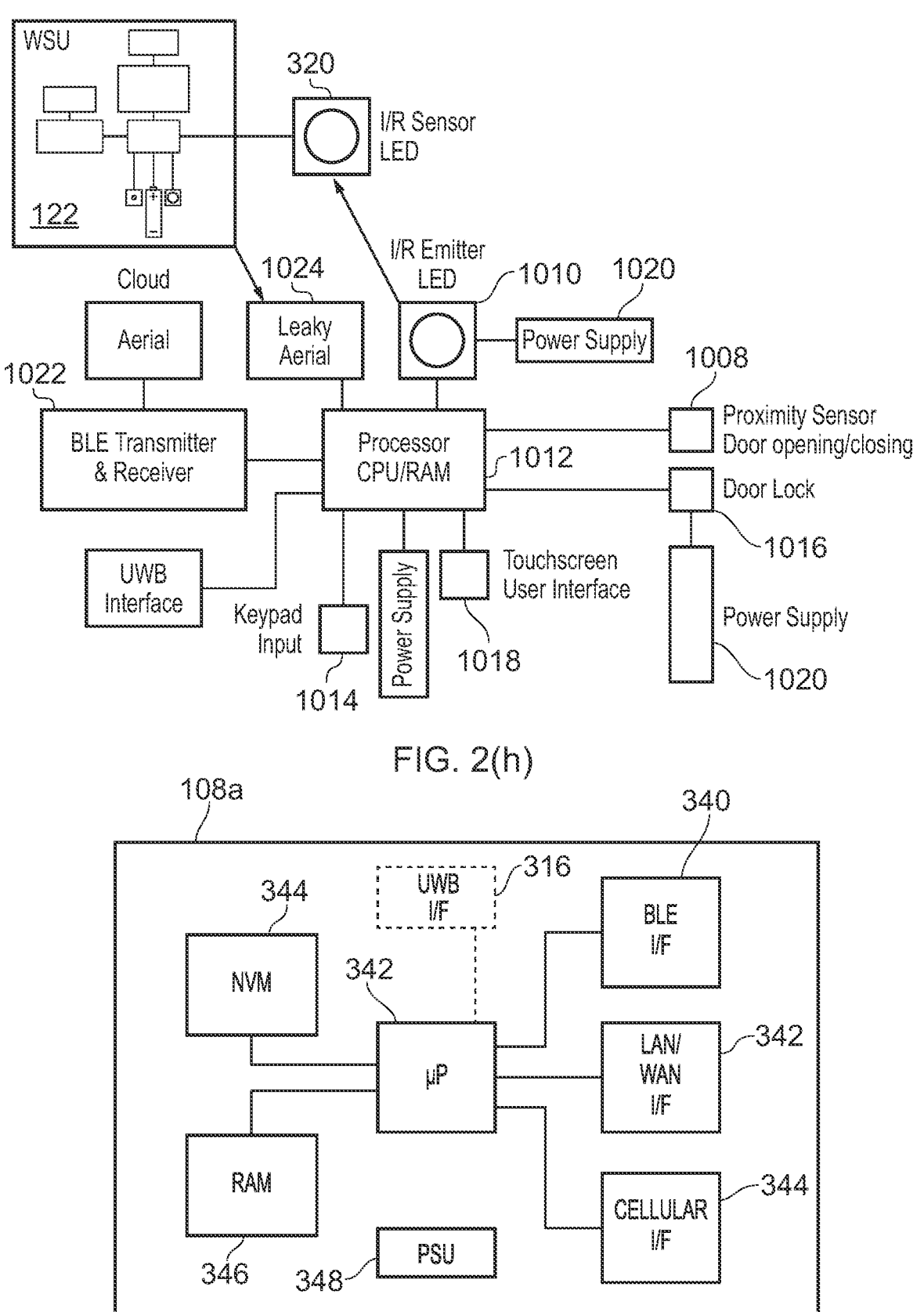
FIG. 3 is a schematic block diagram of the internal electronics of the (external) gateway 108*a* to 108*f* of FIG. 1, in an embodiment.

FIG. 2(h) is a schematic block diagram of the internal electronics of the cabinet 1000 of any of FIGS. 2(c) to 2(h), in another embodiment. This is essentially the same as that of FIG. 2(b), and like references indicate like elements. In this embodiment, the cabinet controller 1012 comprises or is connected to a further wireless interface, for communication with asset tags 602. This further wireless interface may comprise an ultra-wideband (UWB) interface 1030, as discussed further below.

FIG. 3 is a schematic block diagram of the internal electronics of the (external) gateway 108a to 108f of FIG. 1, in an embodiment. A processor 302 is coupled for operation in conjunction with memory devices, such as non-volatile memory 304 and RAM 306. All components of the external gateway 108a may be powered by poser supply unit 308. In this embodiment, the cabinet controller 1012 comprises or is connected to a further wireless interface, for communication with asset tags 602. This further wireless interface may comprise an ultra-wideband (UWB) interface 316, as discussed further below.

The processor 302 may be coupled for operation with a first wireless interface, such as BLE interface 310. The processor 302 may be coupled for operation with a second wireless interface, such as cellular interface 314. The processor 302 may be coupled for operation with a fixed interface, such as LAN/WAN interface 312. The latter interfaces may allow communication with CCC 116 via network 118. Optionally, the processor 302 may be coupled for operation with a third wireless interface, such as UWB interface 316.

Figure 4A:
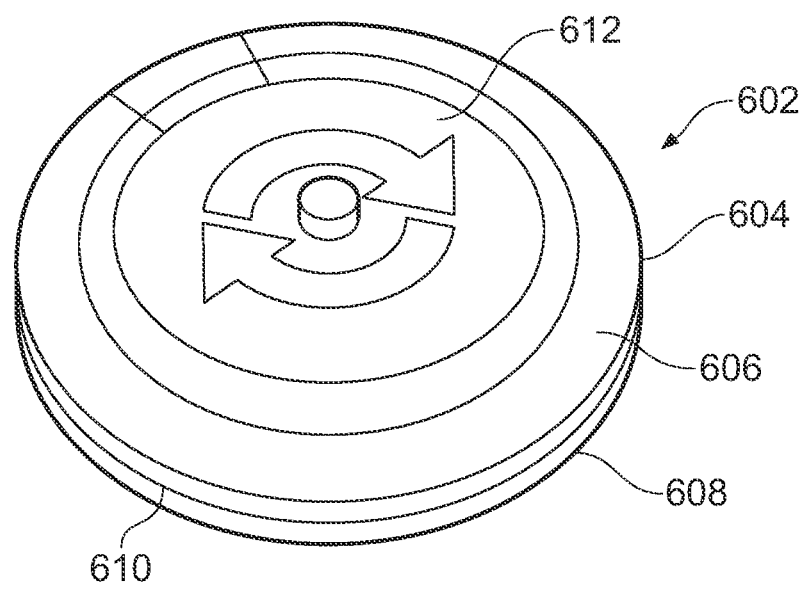
FIG. 4 (*a*) is a perspective view of an asset tag according to an embodiment, and FIG. 4(*b*) is a block diagram of the electronics of the asset tag of FIG. 4(*a*)
Figure 4B:
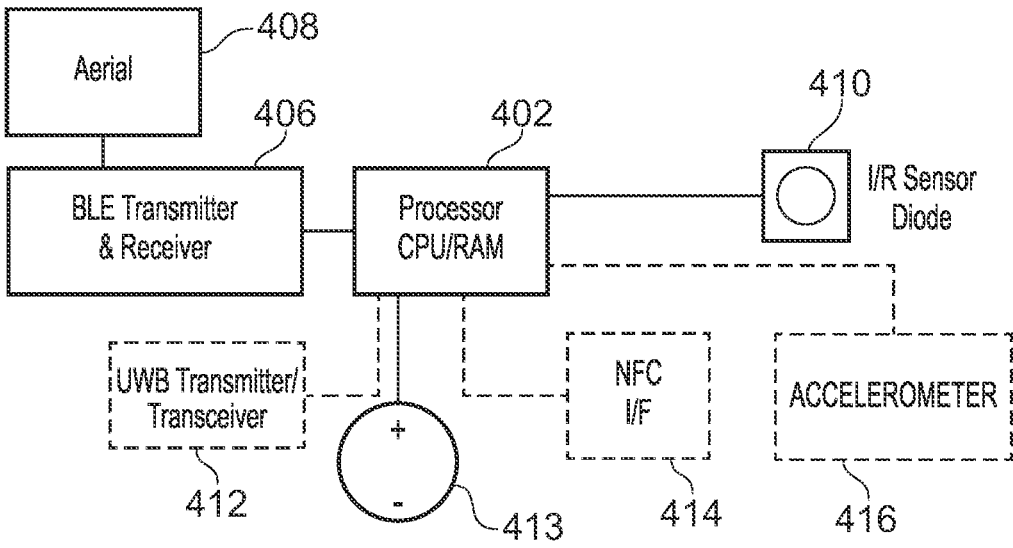

FIG. 4(a) is a perspective view of an asset tag according to an embodiment, and FIG. 4(b) is a block diagram of the electronics of the asset tag of FIG. 4(a).

As seen in FIG. 4(a), the asset tag 602 comprises a housing 604 may be made of any suitable plastics material and formed by moulding techniques that are well known in the art. The housing 604 may be moulded as a unitary housing, or may be formed by two housing halves 606, 608 which are joined by suitable plastics welding techniques at joint 610.

As seen in FIG. 4(b), the asset tag 602 comprises a processor 402, to which is coupled to a first wireless interface 406 (e.g., a BLE transmitter or transceiver) that communicates via antenna 408. A suitable part for the BLE transmitter or transceiver is MDBT42V or MDBT42V-P available from Raytac Corporation.

5.3.4. Transmitter Specification

| Symbol | Description | Min. | Typ. | Max. | Units |
|---|---|---|---|---|---|
| $P_{RF}$ | Maximum output power | | 4 | 6 | dBm |
| $P_{RFC}$ | RF power control range | | 24 | | dB |
| $P_{RFCR}$ | RF power accuracy | | | ±4 | dB |
| $P_{RF1, 1}$ | 1st Adjacent Channel Transmit Power 1 MHz (1 Msps Nordic proprietary mode) | | −25 | | dBc |
| $P_{RF2, 1}$ | 2nd Adjacent Channel Transmit Power 2 MHz (1 Msps Nordic proprietary mode) | | −50 | | dBc |
| $P_{RF1, 2}$ | 1st Adjacent Channel Transmit Power 2 MHz (2 Msps Nordic proprietary mode) | | −25 | | dBc |
| $P_{RF2, 2}$ | 2nd Adjacent Channel Transmit Power 4 MHz (2 Msps Nordic proprietary mode) | | −50 | | dBc |
| $P_{RF1, 2, BLE}$ | 1st Adjacent Channel Transmit Power 2 MHZ (2 Msps BLE mode) | | −20 | | dBc |
| $P_{RF2, 2, BLE}$ | 2nd Adjacent Channel Transmit Power 4 MHz (2 Msps BLE mode) | | −50 | | dBc |

The MDBT42V BLE device provides a range of over 80 meters in open space. The MDBT42V-P BLE device provides a range of up to 60 meters in open space. The firmware of the BLE device can be programmed to provide the required BLE transmit range—to provide a broadcast range of up to 0.5M (for CLSB)) and/or to provide a broadcast range of 0.5M to 80M (for CHSB).

The processor 402 may be coupled to an optical sensor 410, such as an IR diode detector. Optionally, the processor 402 is coupled to a second wireless interface 412, such as an UWB transmitter or transceiver.

Optionally, the processor 402 is coupled to a third wireless interface 414, such as an NFC transmitter or transceiver. Optionally, the processor 402 is coupled to a motion sensing device 416, such as an accelerometer. Preferably, all components of the asset tag 602 are powered by a battery 413.

Determining the Assets Removed or Returned and Optionally Tracking Location

Currently, assets such as power tools that are stored and require issue/return need to be stored in lockers. This can become costly as one locker door is required to manage each asset to ensure there is traceability—which user has taken which asset.

In an embodiment, the system consists of three main elements (one or more of which are optional):

an asset tag 602 with BLE broadcasting at high and low strength, and optional ultrawideband and NFC signalling;

a cabinet 1000 with, e.g., a card reader 1022, touchscreen 1018 to control user access and cabinet controller 1012 to read BLE signals from the asset tags;

a gateway 108 for picking up BLE high strength signals and optional ultrawideband from the asset tags when they are away from the cabinet 1000.

The system may involve the use of one or both of the following:

CCC 116—running cloud-based software that controls asset IDs, user IDs, etc.; and A wireless portable device (e.g., smartphone) using an app that communicates with the asset tag via NFC and BLE, e.g., to assign assets to the asset tag The operation will be briefly described, for a particular embodiment. As used herein, "Asset ID", "Asset BLE ID" and/or "Tag ID" may be used interchangeably.

The asset tags 602 are attached to assets 1030. They emit a high strength BLE signal and a low strength BLE signal.

When inside a cabinet 1000 the low strength BLE signal may be picked up by a cabinet controller 1012. When the low strength BLE signal appears to the cabinet controller 1012 an asset will be inside the Cabinet 1000. When the low strength BLE signal disappears, the asset will have been removed from the cabinet 1000.

A user must use a card, key or touchscreen 1018 to enter a cabinet 1000. By checking the low strength BLE signals before a user is allowed access to the cabinet 1000 and also once they have closed the door on the cabinet 1000, it can be established which user has taken or returned an asset 1030 from a cabinet 1000.

In an embodiment, once the asset 1030 is outside the cabinet 1000 it may be picked up by gateway 108s that are able to receive BLE signals. In an embodiment, the high strength BLE signal can be read be the gateway 108s which can determine the asset tag's position or last known position, e.g., around a factory.

In an embodiment, a wireless portable device (e.g., smartphone) can be used to change the strength and frequency of the low strength and high strength BLE signals using NFC. In an embodiment, this can also be used to Assign an Asset to the BLE identifier the Asset tag.

In an embodiment, the CCC 116 (cloud-based software) collects BLE signal updates from the cabinet 1000 cabinet controller 1012 or gateway 108 and allows devices to report on which users checked in or out which assets or where they are currently located. In an embodiment, the cloud-based software also allows for changes to user access rights to the Cabinet 1000s and updates any changes to Asset IDs and descriptions.

An advantage is that, by using asset tags 602, multiple assets 1030 may be on one shelf and one can still track which users have taken and returned each asset 1030. As multiple Assets are stored behind one (cabinet) door 1006, the cost to manage these assets significantly reduces.

In addition, in an embodiment, the assets can also be tracked with BLE using gateway 108s around the site after issuance from the Cabinet 1000.

There follow various flow diagrams illustrating operations performed on various devices. In the flow diagrams, steps are numbered and have a ")" as a suffix.

Figure 5B:
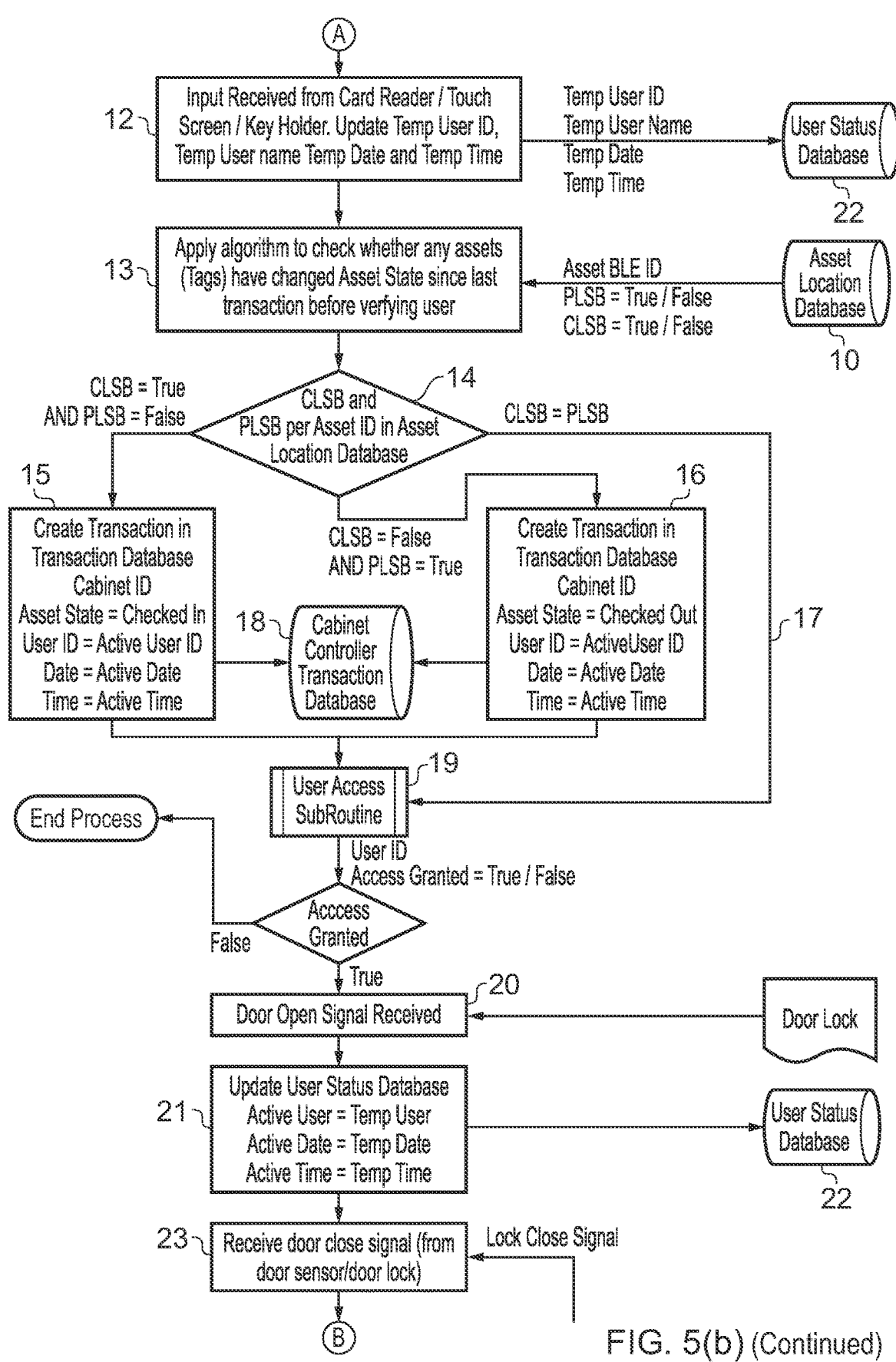
FIG. 5(*a*) is a flowchart of the operations performed on an asset tag, FIG. 5(*b*) is a flowchart of the operations performed by the cabinet controller 1012, FIG. 5(*c*) is a flowchart of the operations performed at an external gateway 108, and FIG. 5(*d*) is a flowchart of the operations performed at the central control computer 116, FIG. 5(*e*) is a flowchart of the operations performed at a portable wireless device, and FIG. 5(*f*) is a flowchart of the operations for access control performed at the cabinet controller 1012, in an embodiment for determining the assets removed or returned by a user and optionally tracking the location of the asset.
Figure 5B:
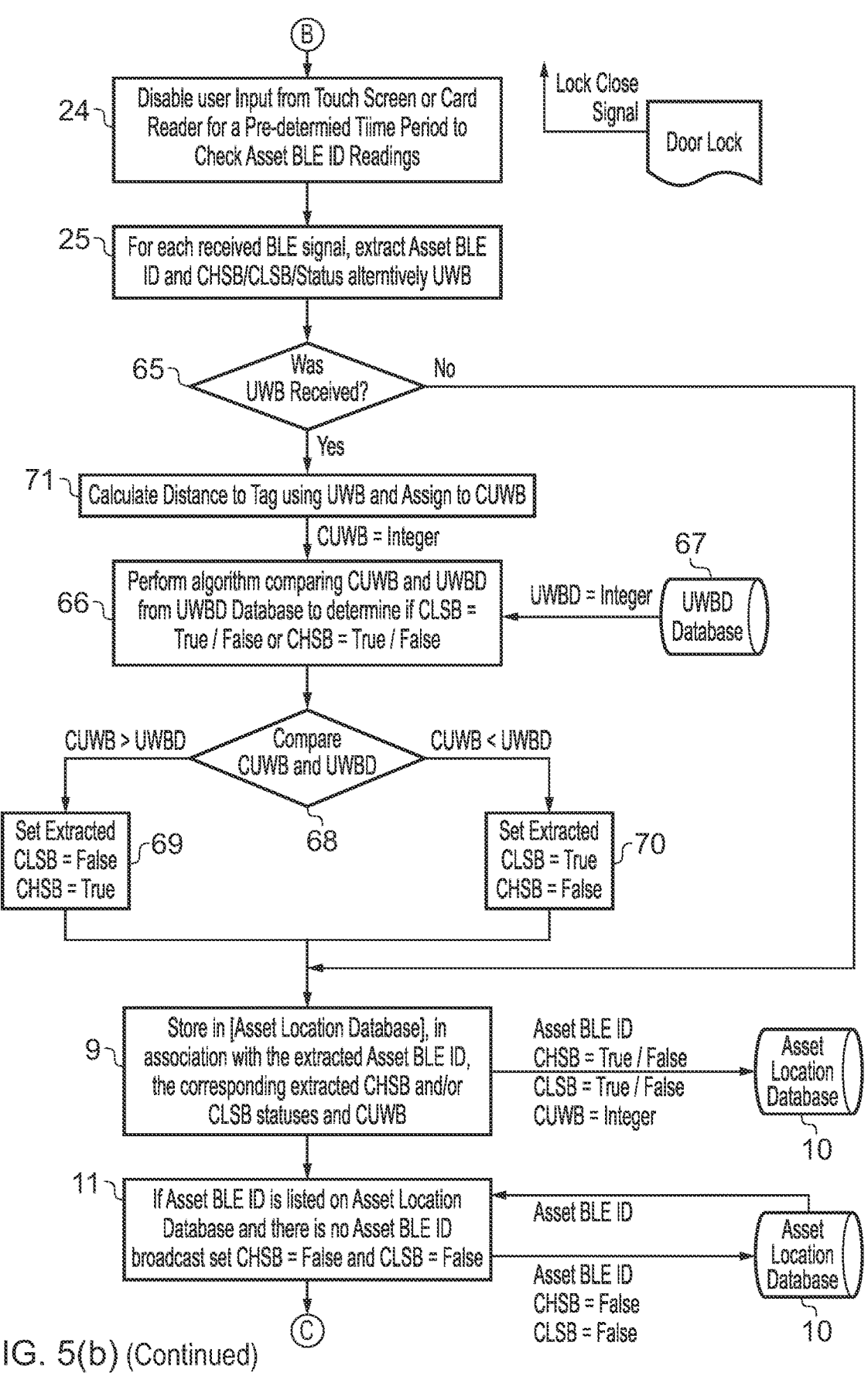
Figure 5B:
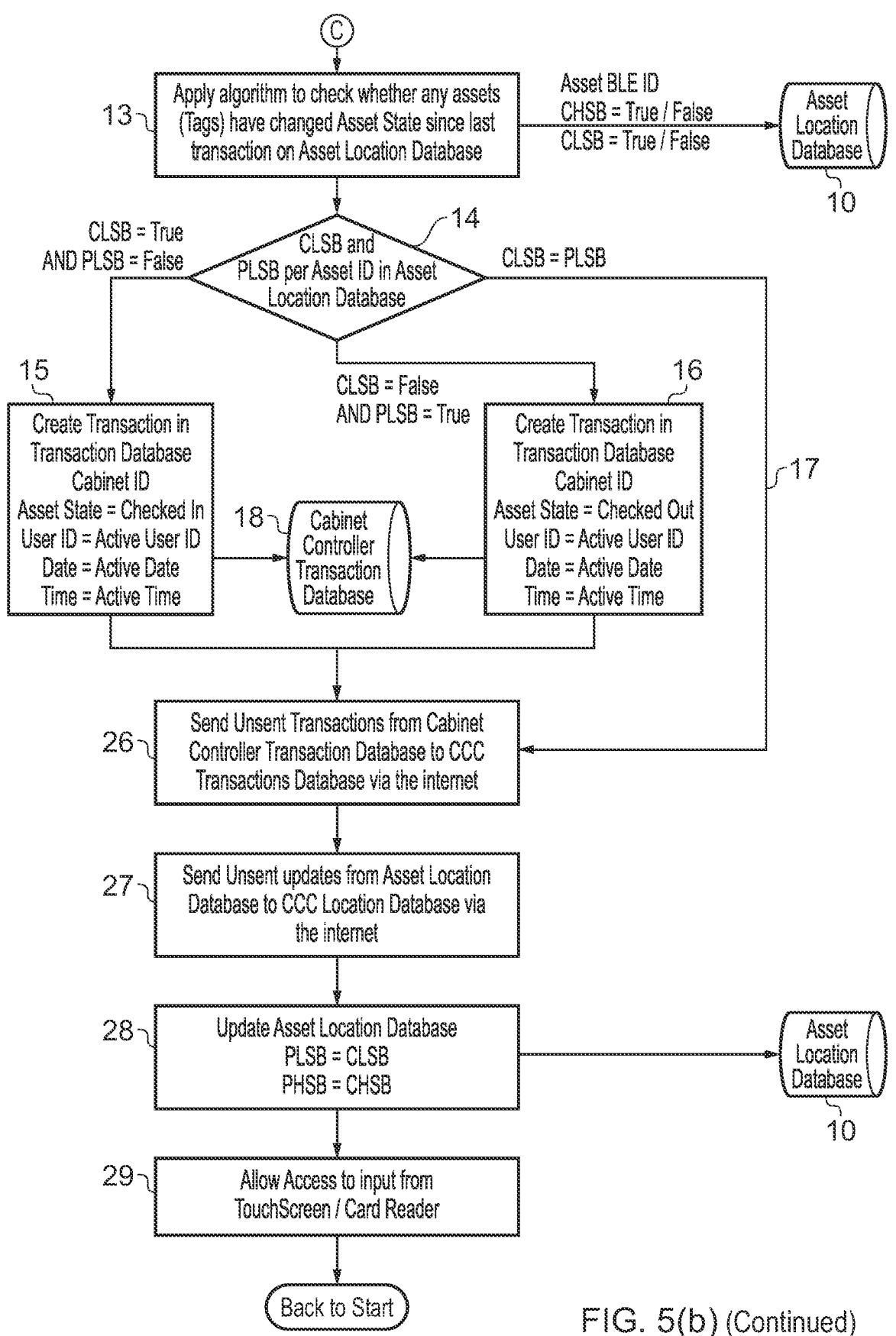
Figure 5C:
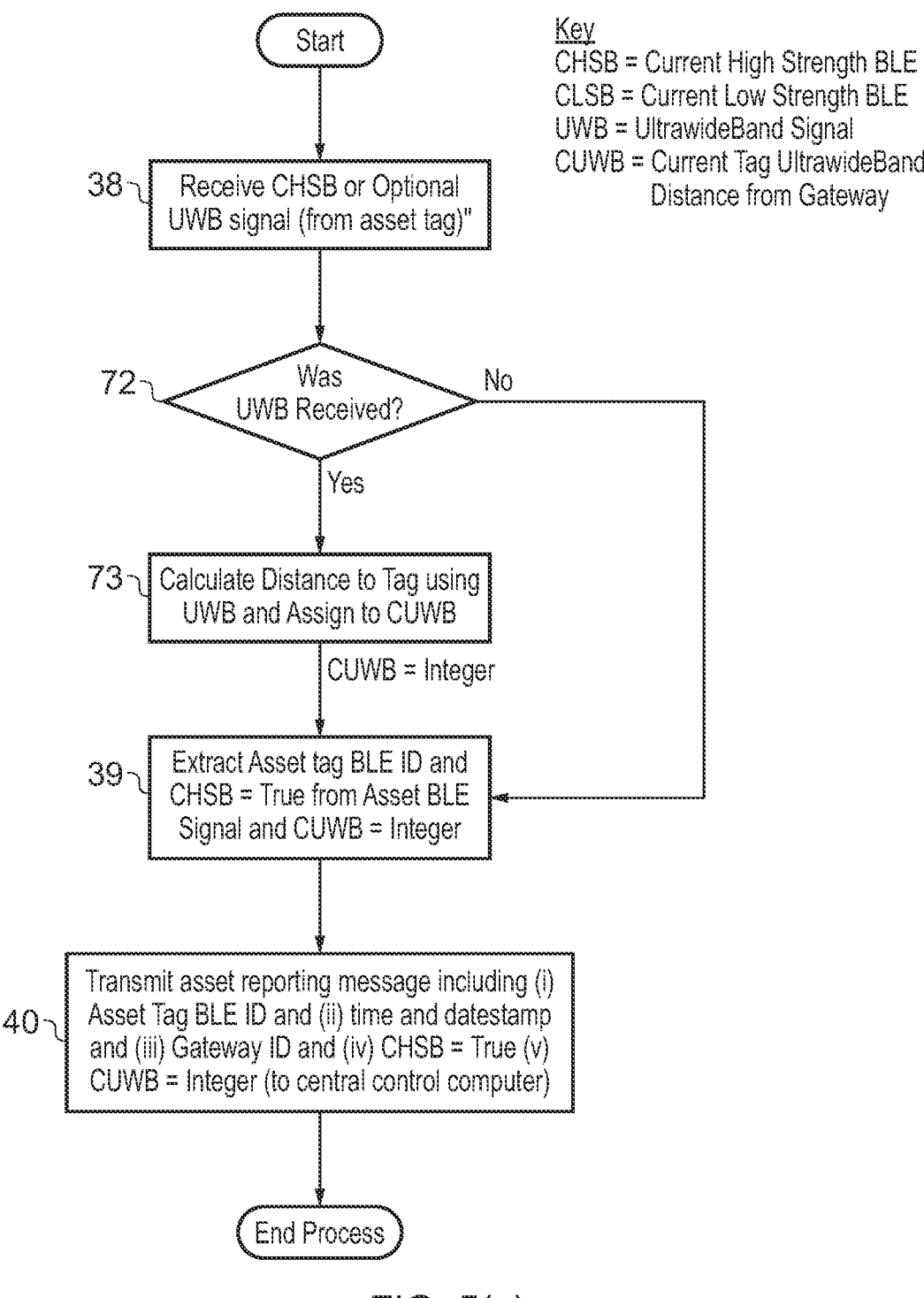
Figure 5D:
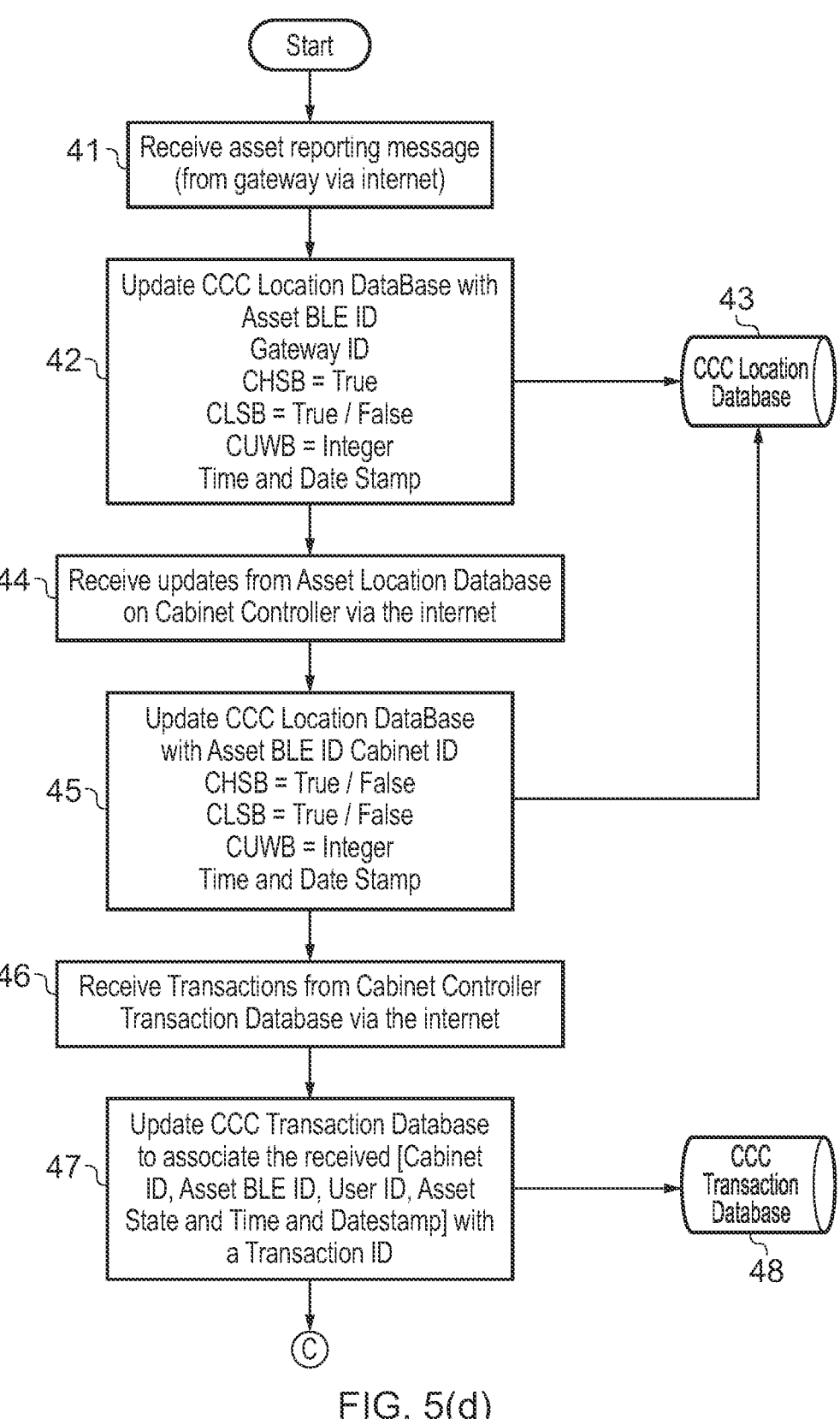
Figure 5D:
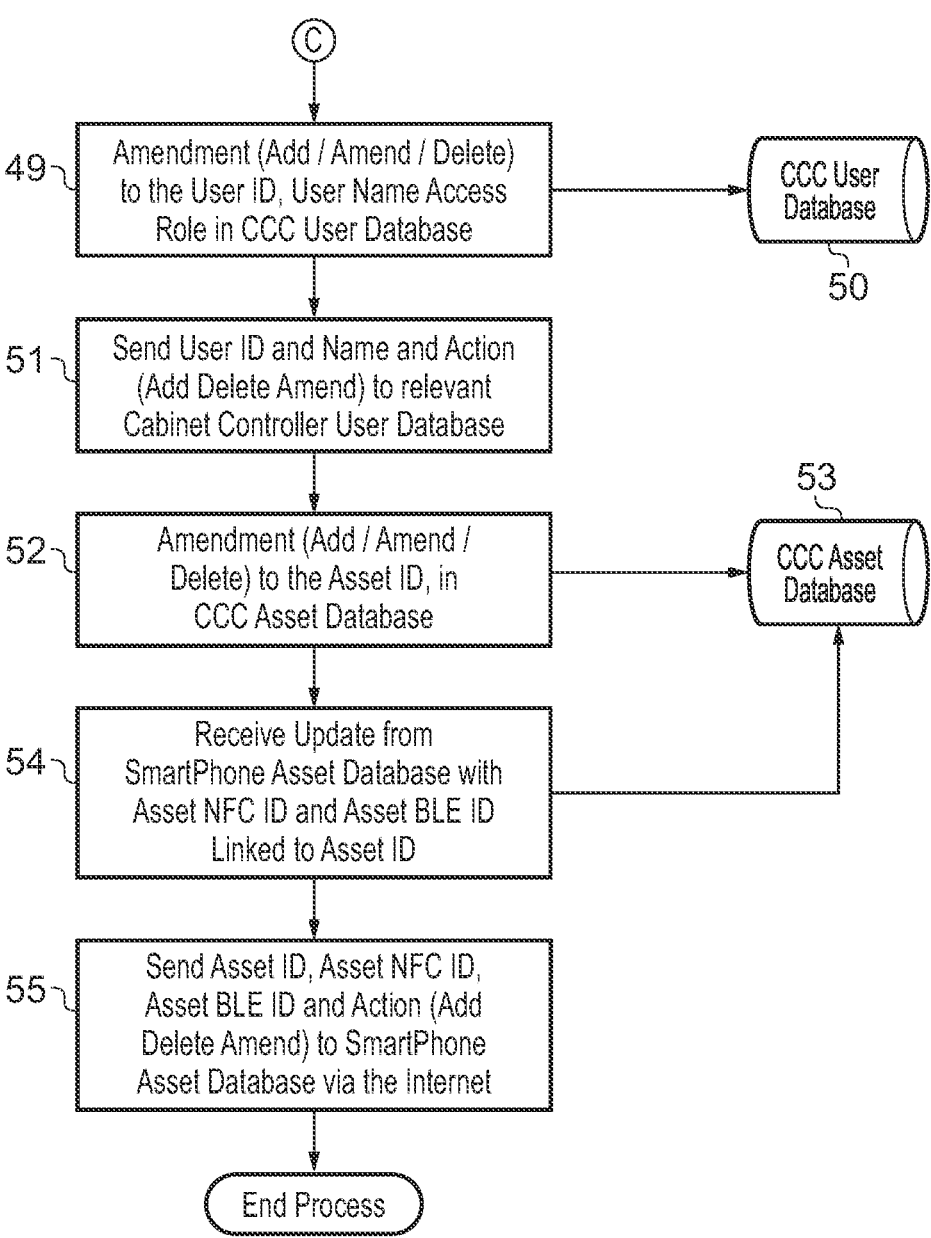
Figure 5E:
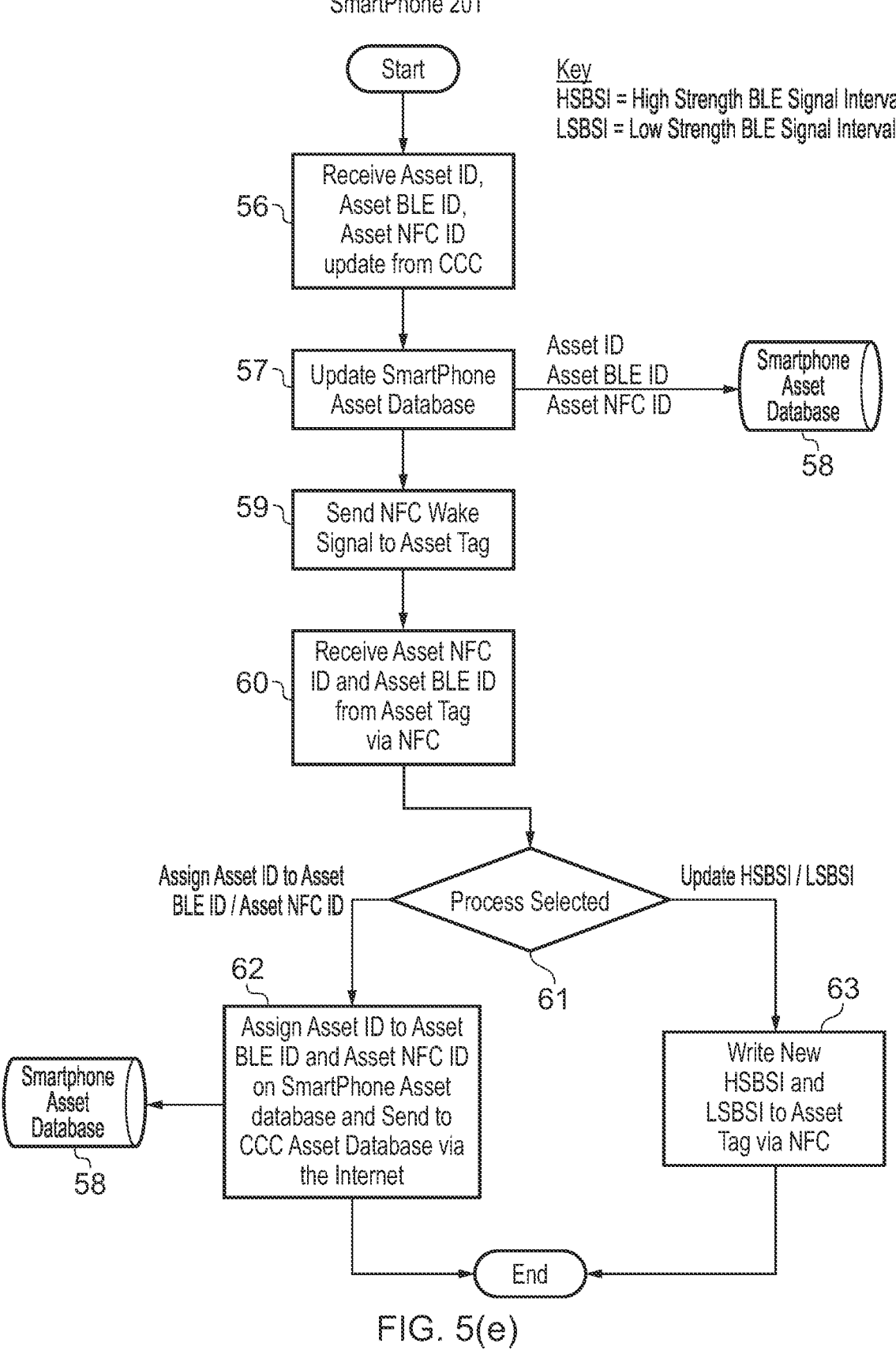
Figure 5F:
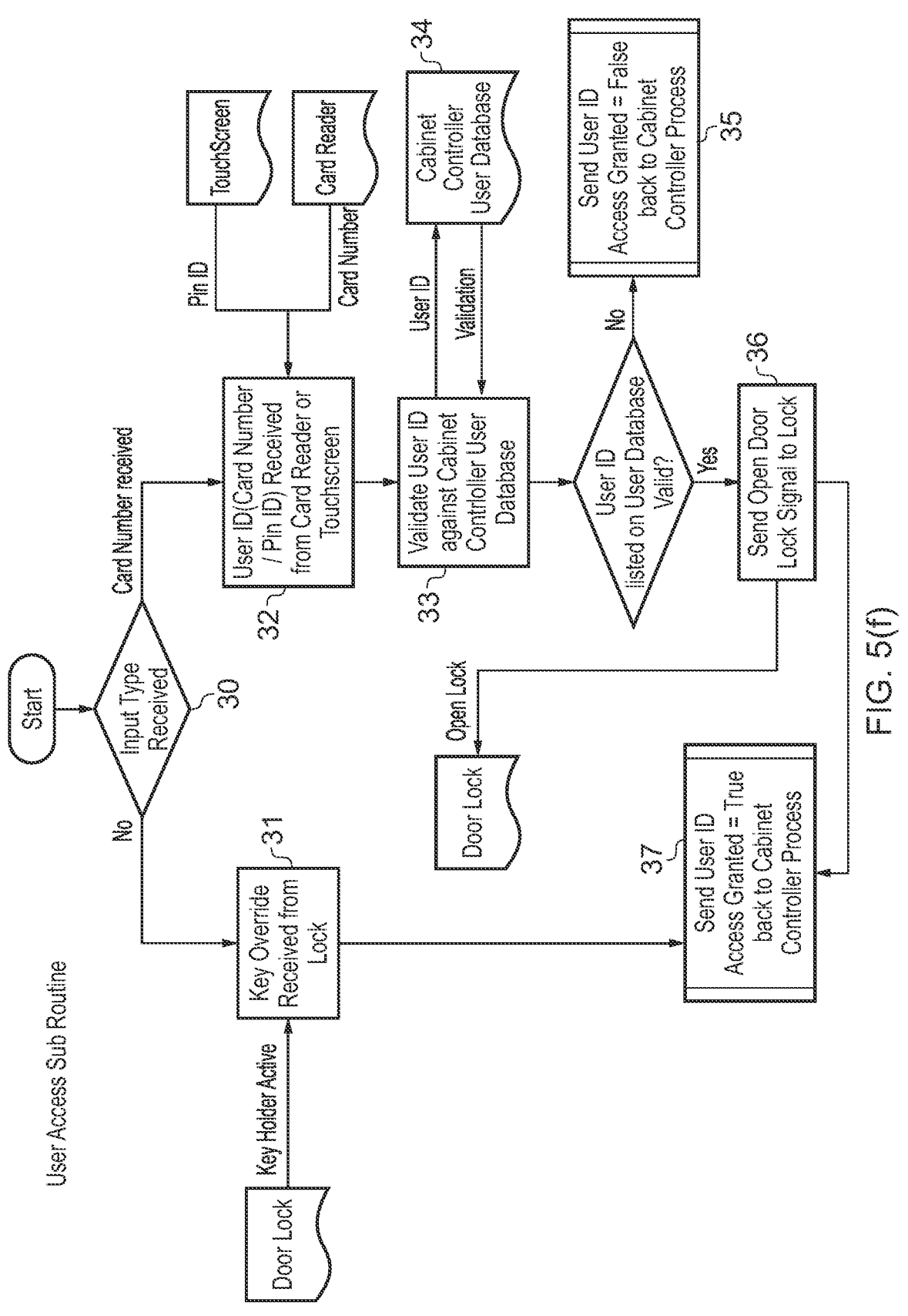

FIG. 5(a) is a flowchart of the operations performed on an asset tag, FIG. 5(b) is a flowchart of the operations performed by the cabinet controller 1012, FIG. 5(c) is a flowchart of the operations performed at an external gateway 108, and FIG. 5(d) is a flowchart of the operations performed at the central control computer 116, FIG. 5(e) is a flowchart of the operations performed at a portable wireless device, and FIG. 5(f) is a flowchart of the operations for access control performed at the cabinet controller 1012, in an embodiment for determining the assets removed or returned by a user and optionally tracking the location of the asset. In the techniques of FIGS. 5(a) to 5(f), and as described elsewhere herein, the use and processing of UWB signals is optional.

FIG. 5(a) is a flowchart of the operations performed on an asset tag in an embodiment for determining the assets removed or returned by a user and optionally tracking the location of the asset. (Steps 1) to 5) will be discussed hereinbelow with reference to FIG. 5(e).)

In FIG. 5(a), the steps are as follows:

6) Broadcast Low Strength BLE Signal (CLSB). This may have a broadcast range of up to 0.5M. This may consist of the Asset BLE ID, CLSB=True. Low Strength BLE Signal Strength interval (LSBSI) is how often a BLE Low Strength Signal is emitted from the asset tag 604. A typical interval LSBSI is in the range 0.5 to 3 sec, preferably 1 sec. In an embodiment, this can be changed on the asset tag 604 firmware using NFC.

7) Broadcast High Strength BLE Signal (CHSB). This may have a broadcast range of 0.5M to 80M. This may consist of the Asset BLE ID, CHSB=True. The High Strength BLE Signal Strength interval (HSBSI). This is how often a BLE high Strength Signal is emitted from the asset tag 604. A typical interval HSBSI is in the range 6 seconds to 3 minutes, and preferable 8 seconds. In an embodiment, this may be changed on the Asset tag firmware using NFC.

64) In an embodiment, there is an optional broadcast Ultrawide Band signal (e.g., every LBSI and/or every HSBI) and that is read as integer distance by the cabinet controller 1012.

FIG. 5(b) is a flowchart of the operations performed by the cabinet controller 1012 in an embodiment for determining the assets 1030 removed or returned by a user and optionally tracking the location of the asset.

In an embodiment, at step 8 the cabinet controller 1012 is listening for Asset BLE IDs in the cabinet 1000. This may be done periodically with a predetermined period (e.g., minimum 1 second and maximum every 60 seconds) and be configurable.

In an embodiment, at step 65 a check is made as to whether an UltraWide Band Signal is received. If yes, an algorithm may be started to see how far from Cabinet controller 1012 the Tag is and to Set CLSB and CHSB from True to False. In an embodiment, at step 65 a check is made as to how far the Asset Tag is from the Cabinet Controller using Ultrawide Band and assign distance to CUWB. That is, knowing the UWB transmit power (locally stored) of the asset tag 602, and using the received signal strength of the UWB signal, the distance CUWB can be calculated.

In an embodiment, at step 66 a check is made on how far the Asset tag is from the Cabinet controller 1012 using Ultrawide Band signal reception. A predetermined number (threshold; UWBD) may be pre-programmed onto UWBD database. This predetermined number is the distance from the Cabinet controller 1012 inside which an Asset is considered checked In and outside inside considered to be Checked Out of the Cabinet 1000.

| 67) UWBD Database | |
| --- | --- |
| UWBD | |
| 25 | |

In an embodiment, at step 68, the Cabinet controller 1012 compares CUWB (distance from tag determined using UWB) with the predetermined number UWBD. If CUWB>UWBD the Tag is a greater distance than the threshold so therefore outside the Cabinet 1000. Therefore, the setting is CHSB=True (69)). In an embodiment, at step 68, the Cabinet 1000 cabinet controller 1012 compares CUWB (distance from tag determined using UWB) with a set number UWBD. If CUWB<UWBD the Tag is a lesser distance than the threshold so is therefore Inside the Cabinet 1000 and therefore the setting is CLSB=False (70)).

In an embodiment, at step 9, any Asset IDs broadcast may have Asset IDs and True or False values to indicate whether the CHSB or CLSB is broadcast. The Asset Location Database on Cabinet 1000 may therefore be updated.

| 10) Asset Location Database on Cabinet controller 1012 | | | | | |
| --- | --- | --- | --- | --- | --- |
| Asset BLE ID (Key) | CHSB | CLSB | CUWB | PHSB | PLSB |
| ST; f9:d2:6b:12:a2:33 | TRUE | FALSE | 2 | FALSE | TRUE |
| ST; d8:20:74:77:1f:f5 | TRUE | TRUE | 50 | FALSE | TRUE |
| ST; f0:1a:4f:46:79:a3 | FALSE | TRUE | 75 | FALSE | FALSE |

In an embodiment, at step 11, there may be Asset BLE IDs that were previously read by the Cabinet 1000 cabinet controller 1012 but now no broadcast is received. For these Asset IDs, the CHSB and CLSB need to be set to False as neither can be read.

In an embodiment, steps 8-11 are repeated as per step 8. This is in order that the Status of CLSB and PLSB are known and can be processed as soon as input has been received from step 12 and there is no delay letting the user into the Cabinet 1000.

In an embodiment, at step 12, an input is received from a cabinet access device (e.g., the Card Reader 1022/Touchscreen 1018/Key Holder) due to a user seeking to access the Cabinet 1000 and unlock the doors. The User ID may be a card or pin number of pre-defined ID if the Key Holder is used. A check may be made for any changes of status between the CLSB and PLSB for each Asset ID before verifying the user. The User ID, User Name, Date and Time may be stored in Temp Fields on the User Status Database.

In an embodiment, at step 13, a check may be made for any Assets states that were missed during the previous Active user's transaction (either Asset BLE ID was incorrectly still read by the cabinet controller 1012 and incorrectly assumed to be in the Cabinet 1000 or the signal missed and incorrectly assumed to be out of the Cabinet 1000).

An algorithm (14) to 16)) is applied to check whether any assets have changed asset state since the last transaction.

In an embodiment, at step 15, if the CLSB=True and the PLSB=False it is the case that an Asset BLE ID that was not previously present is being read. It is assumed that the previous user (Active user) has booked this into the Cabinet 1000 and that the Asset ID BLE broadcast was missed. Therefore, a user transaction may be created to allocate a Checked In status for this Asset ID to the previous users (Active) User ID, and previous (Active) Time and Date Stamp.

In an embodiment, at step 16, if the CLSB=False and the PLSB=True, it is the case that an Asset BLE ID that was previously present on the last user's transaction is being read. It is assumed that the previous user (Active User) has taken this asset from the Cabinet 1000 and the Asset ID BLE broadcast was still picked up in error. Therefore, a user transaction may be created to allocate a Checked-Out status for this Asset ID to the previous users (Active User ID), and previous (Active) Time and Date Stamp.

In an embodiment, at step 17, as the CLSB and PLSB are the same there is no change to the Status of the Asset, and it is therefore assumed the previous transaction was correct. Therefore, no change is required.

| Transaction ID (Key) | Asset BLE ID | Cabinet ID | Asset State | User ID | User | Date | Time |
|---|---|---|---|---|---|---|---|
| 1 | ST;f9:d2:6b:12:a2:33 | IVFL1 | Checked Out | 234 | Anthony Clarke | 24/01/2022 | 14.05 |
| 2 | ST;d8:20:74:77:1f:f5 | IVFL1 | Checked In | 235 | Dave Small | 23/01/2022 | 10.23 |
| 3 | ST;f0:1a:4f:46:79:a3 | IVFL1 | Checked In | 256 | Dean Henry | 25/01/2022 | 16.55 |

Cabinet controller Transaction Database

In an embodiment, at step 19, a user Access Sub Routine is performed, as discussed in detailed hereinbelow with reference to FIG. **5(*f*). This determines whether an Input from a user at an access device (Key Holder, Touchscreen 1018 or Card Reader 1022**) is valid and whether the user to allowed access.

In an embodiment, at step 19*a*), a decision is made as to whether Access is granted to user. If Access is Not granted processing returns to the start of the Access process. If Access is Granted, the Doors will have been unlocked and signal sent (s20) to the cabinet controller 1012. In an embodiment, at step 21, if User Access is granted, an update the User Status Database is performed. First, all of the details from the Temp fields are copied into the Active User ID, Active User, Active Date and Time fields.

| Temp User ID | Temp User | Temp Date | Temp Time | Active User ID | Active User | Active Date | Active Time |
|---|---|---|---|---|---|---|---|
| 256 | Dean Henry | 25/01/2022 | 16.55 | 234 | Anthony Clarke | 24/01/2022 | 14.05 |

User Status Database

In an embodiment, at step 23, a Door Close signal is Received and lock is activated as user has completed their transaction. In an embodiment, at step 24, user Input from the Touch Screen or Card Reader 1022 may be Disabled for a Pre-determined Time Period in order to Check Asset BLE ID Readings. In an embodiment, this is configurable from 10 Seconds up to 30 seconds, for example.

In an embodiment, at step 25, the Cabinet controller 1012 is listening for Asset BLE IDs from asset tags in the Cabinet 1000. As a transaction has just been completed, the Cabinet controller 1012 may read (listen) for pre-determined period in step 24. An Asset BLE ID and CHSB and/or CLSB and optionally UWB may be extracted.

The ensuing steps (65, 71, 66, 68-70 and 9-16) may be performed as described hereinabove.

In an embodiment, at step 26, as the Transaction is complete, any unsent transactions can be sent to the Transactions Database on the CCC 116 via the internet. In an embodiment, at block 27, any Updates to Asset location Database are passed to CCC 116 Location Database to update the location database to allow reporting of the last known position of an Asset (asset tag).

In an embodiment, at step 28, the Transaction is now complete so that the Current Readings are logged as previous readings for both High and Low Strength BLE. This may allow the relevant PLSB and CLSB comparisons to be performed when a next user is triggered (gains access). CLSB may be updated periodically as CLSB signals are received and the previous readings are saved. In an embodiment, at step 29, once the readings are complete and the transaction updated the access device(s) (Touch Screen/Card Reader 1022) may be unlocked for input by users—for the next user.

FIG. **5(*c*) is a flowchart of the operations performed at an external gateway 108** in an embodiment for determining the assets removed or returned by a user and optionally tracking the location of the asset.

In an embodiment, at step 38, a CHSB—High Strength BLE Signal (an optionally the UWB signal) is received from an Asset tag. In an embodiment, at step 72 a check is made whether an UltraWide Band Signal is received. If yes, an algorithm is started to see how far from Controller the Tag 602 is and Set CLSB and CHSB from True to False. In an embodiment, at step 73 the distance of the Asset Tag 602 is from the Gateway is calculated using Ultrawide Band (as described above) and the distance assign to CUWB.

In an embodiment, at step 39, the Asset tag BLE ID, and (i) CHSB=True and/or (ii) CUWB=Integer is extracted from the Asset BLE/UWB signal.

At step 40), an Asset Reporting Message is sent to CCC.

An example of Asset Reporting Message sent to CCC is given below. Gateway 108 reference is a unique identifier.

| Asset BLE ID (Key) | Gateway ID | CHSB | Time and Date Stamp |
|---|---|---|---|
| ST; f9:d2:6b:12:a2:33 | INV-GTW-1 | TRUE | 24/01/23 10.33 |
| ST; d8:20:74:77:1f:f5 | INV-GTW-2 | TRUE | 23/01/23 11.55 |

FIG. **5(*d*) is a flowchart of the operations performed at the central control computer 116** in an embodiment for determining the assets removed or returned by a user and optionally tracking the location of the asset.

In an embodiment, at step 41, an update is received from a gateway 108 in step 40. In an embodiment, at step 42, an update CCC 116 Location database is performed. This updates the Asset's Last Know Position

| Asset BLE ID (Key) | Gateway ID | Cabinet ID | CLSB | CHSB | CUWB | Time and Date Stamp |
|---|---|---|---|---|---|---|
| ST;f9:d2:6b:12:a2:33 | INV-GTW-1 | | FALSE | TRUE | | 24/01/23 10.33 |
| ST;d8:20:74:77:1f:f5 | INV-GTW-2 | | FALSE | TRUE | 700 | 23/01/23 11.55 |
| ST;f0:1a:4f:46:79:a3 | | IVFL1 | TRUE | FALSE | | 25/01/23 12.01 |

CCC Location Database

In an embodiment, at step 44, an update is received from a Cabinet 1000 Cabinet controller 1012 Asset Location Database in step 27. In an embodiment, at step 45 an update of CCC 116 Location database is performed. This updates the Assets Last Know Position. In an embodiment, at step 46, an update is received from a Cabinet 1000 Cabinet controller 1012 Transaction Database in step 26. In an embodiment, at step 47, update CCC 116 Transaction database is performed. This updates whether the Asset is checked in or out of a Cabinet 1000, with User, Time and Date Stamp creating a transaction ID.

| Transaction ID (Key) | Asset BLE ID (key) | Cabinet ID | Asset State | User ID | User | Date | Time |
|---|---|---|---|---|---|---|---|
| 1 | ST;f9:d2:6b:12:a2:33 | IVFL1 | Checked Out | 234 | Anthony Clarke | 24/01/2022 | 14.05 |
| 2 | ST;d8:20:74:77:1f:f5 | IVFL1 | Checked In | 235 | Dave Small | 23/01/2022 | 10.23 |
| 3 | ST;f0:1a:4f:46:79:a3 | IVFL1 | Checked In | 256 | Dean Henry | 25/01/2022 | 16.55 |

CCC Transaction Database

In an embodiment, at step 49, changes to the CCC User Database—Addition/Amendment/Deletion is performed. This may result in change of access Role permissions for user ID on a Cabinet 1000 or amending the user details such as Name.

| CCC User Database | | |
|---|---|---|
| User ID | User Name | Access Role (Cabinet 1000 ID) |
| 234 | John Venter | IVFL1, IVFL2, IVFL3 |
| 24598 | David Cooke | IVFL2, IVFL3 |
| 478 | Dave Small | IVFL1 |

In an embodiment, at step 51, the User ID and Name (Add, Delete, Amend) are sent to relevant Cabinet controller 1012 User Database. The action may be based on the change made. For example, if a user name changes then all changes need to be updated on the Cabinet 1000 Cabinet controller 1012 User Database for each listed in the Access Role. If a Cabinet 1000 ID is added or removed to the Access Role, then a message needs to be sent to each Cabinet 1000 ID with the change in User details.

In an embodiment, at step 52, Addition, Amend, Delete to the CCC Asset Database on CCC 116 is performed.

| CCC Asset Database | | |
|---|---|---|
| Asset ID (Key) | Asset BLE ID | Asset NFC ID |
| qennav-puxRom-jakcy0 vokwyk-tuzdod-2semtE cofrov-Zyxdat-4qazna | ST; f9:d2:6b:12:a2:33 ST; d8:20:74:77:1f:f5 | 048BD4B2783F80 0447D4B2783F80 |

In an embodiment, at step 54, updates are received from the Wireless portable device (e.g., smartphone) Asset Database (Asset ID now linked to Asset BLE ID and Asset NFC) CCC 116 Asset Database updated. In an embodiment, at block 55, to Ensure all Wireless portable device (e.g., smartphone) Devices are up to date any Changes to the CCC 116 Asset Database are sent to the Wireless portable device (e.g., smartphone) Asset Database.

FIG. 5(e) is a flowchart of the operations performed at a portable wireless device in an embodiment for determining the assets removed or returned by a user and optionally tracking the location of the asset.

In an embodiment, at step 56, an Asset ID Update is received from the CCC. This may be an Addition of a New Asset added to the Database or an Amendment or Removal of an Asset already listed. It may also be that an Asset ID has been assigned to an Asset BLE ID on another Wireless portable device (e.g., smartphone) and this device needs to be aware of it.

In an embodiment, at step 57, the Asset ID is added to the Wireless portable device (e.g., smartphone) Asset Database Local database. In an embodiment, at step 58, blank Entries may be assigned an Asset BLE ID and Asset NFC ID from Asset tag.

| Smartphone Asset Database | | |
|---|---|---|
| Asset ID (Key) | Asset BLE ID | Asset NFC ID |
| qennav-puxRom-jakcy0 vokwyk-tuzdod-2semtE cofrov-Zyxdat-4qazna | ST; f9:d2:6b:12:a2:33 ST; d8:20:74:77:1f:f5 | 048BD4B2783F80 0447D4B2783F80 |

In an embodiment, at step 59, the wireless portable device 201 (e.g., smartphone) wakes Asset tag via NFC, i.e., in response to the wireless portable device 201 be tapped on or placed in proximity to (the NFC interface 414 of) the asset tag 602. This may be from an App on the Wireless portable device (e.g., smartphone) designed to communicate with the Asset tag and the CCC.

Referring back to FIG. 5(a), at step 1), the NFC wake signal is detected from the wireless portable device 201, and the (the NFC interface 414 of) the asset tag 602 responds by Returning the Tag NFC ID and Asset BLE ID to the wireless portable device 201 (step 2)).

Returning to FIG. 5(*e*), in an embodiment, at step 60, the Asset tag NFC ID and Asset BLE ID are received, for example via NFC (FIG. 5(*e*)).

In an embodiment, at block 61, the app Prompts User to decide process Update HSBSI/LSBSI or to Assign an Asset ID to Asset BLE ID/Asset NFC ID.

(In an embodiment, at step 62, an association is made between the Asset ID and the Asset NFC ID and Asset BLE ID. This may be synced to the CCC 116 Asset Database and then synced to other Smartphones to ensure a one-to-one relationship between the Asset ID and the Asset NFC ID and Asset BLE ID on the Asset tag.)

In an embodiment, although not shown, the wireless portable device 201 may receive one or more user inputs selecting a new LSBSI and/or a new HSBSI and, in response to the portable wireless device being tapped or placed in proximity to (the NFC interface 414 of) the asset tag 602, transmit (step 63) a write signal to (the NFC interface 414 of) the asset tag 602, the write signal including the new LSBSI and/or the new HSBSI. The new LSBSI and/or the new HSBSI may be an interval time in seconds.

Referring back to FIG. 5(*a*), at step 4), the asset tag 602 extracts the new LSBI and/or the new HSBI from the NFC Write Signal. And at step 5), the asset tag 602 updates its Firmware To store the new LSBSI and/or the new HSBDI as the LSBSI and HSBSI, respectively, to be used for signalling.

FIG. 5(*f*) is a flowchart of the operations for access control performed at the cabinet controller 1012, in an embodiment for determining the assets removed or returned by a user and optionally tracking the location of the asset.

In an embodiment, at step 30, an input is received from a user identifying themselves via an access device (e.g., Card Reader 1022 or Touchscreen 1018) to the Cabinet 1000 cabinet controller 1012 or using an override key to access to Cabinet 1000.

In an embodiment, at step 31, the door of the Cabinet 1000 has been unlocked via an override key and the Door lock reports back its unlocked status and that a key was used. In an embodiment, at step 32, a (new) user has scanned card at the Card Reader 1022 or entered a pin number at the Touchscreen 1018 to Identify themselves. A User ID of the user is thereby extracted.

In an embodiment, at step 35, if the User ID is not listed on Cabinet 1000 Cabinet controller 1012 User List, then Granted Access=False and the User ID is returned to the main Cabinet 1000 Cabinet controller 1012 Process. The Door to the Cabinet 1000 remains locked.

In an embodiment, at step 36, as the (extracted) User ID is valid so that an unlock door command is sent to the Door Lock. In an embodiment, at step 37, upon successful entry into the Cabinet 1000, the User ID and Granted Access=True is returned to the Cabinet 1000 Cabinet controller 1012 Process.

Figure 6:
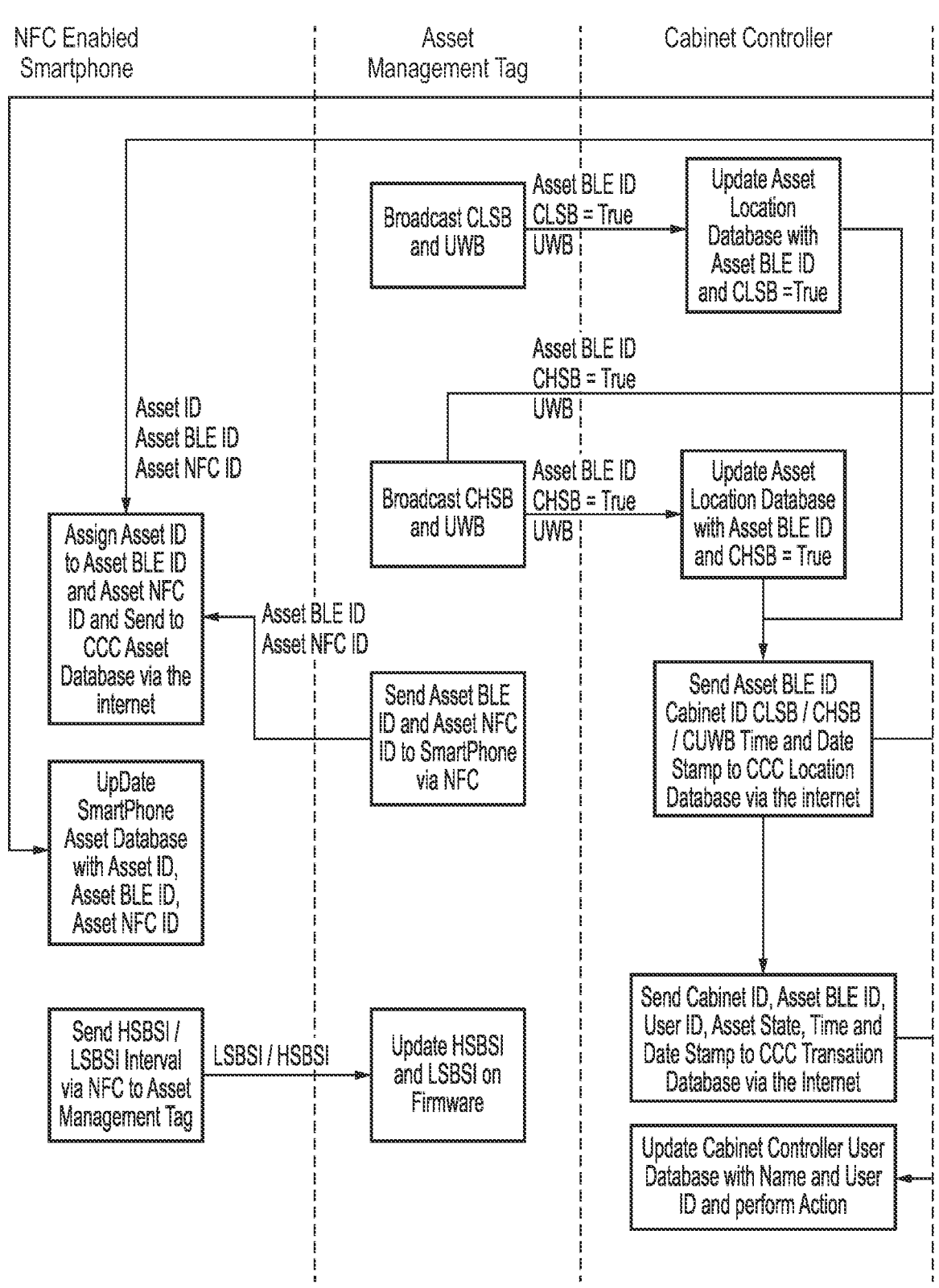
FIG. 6 is an information flow diagram illustrating the flow of messages/information in the embodiment of FIGS. 5(*a*) to 5(*d*)
Figure 6:
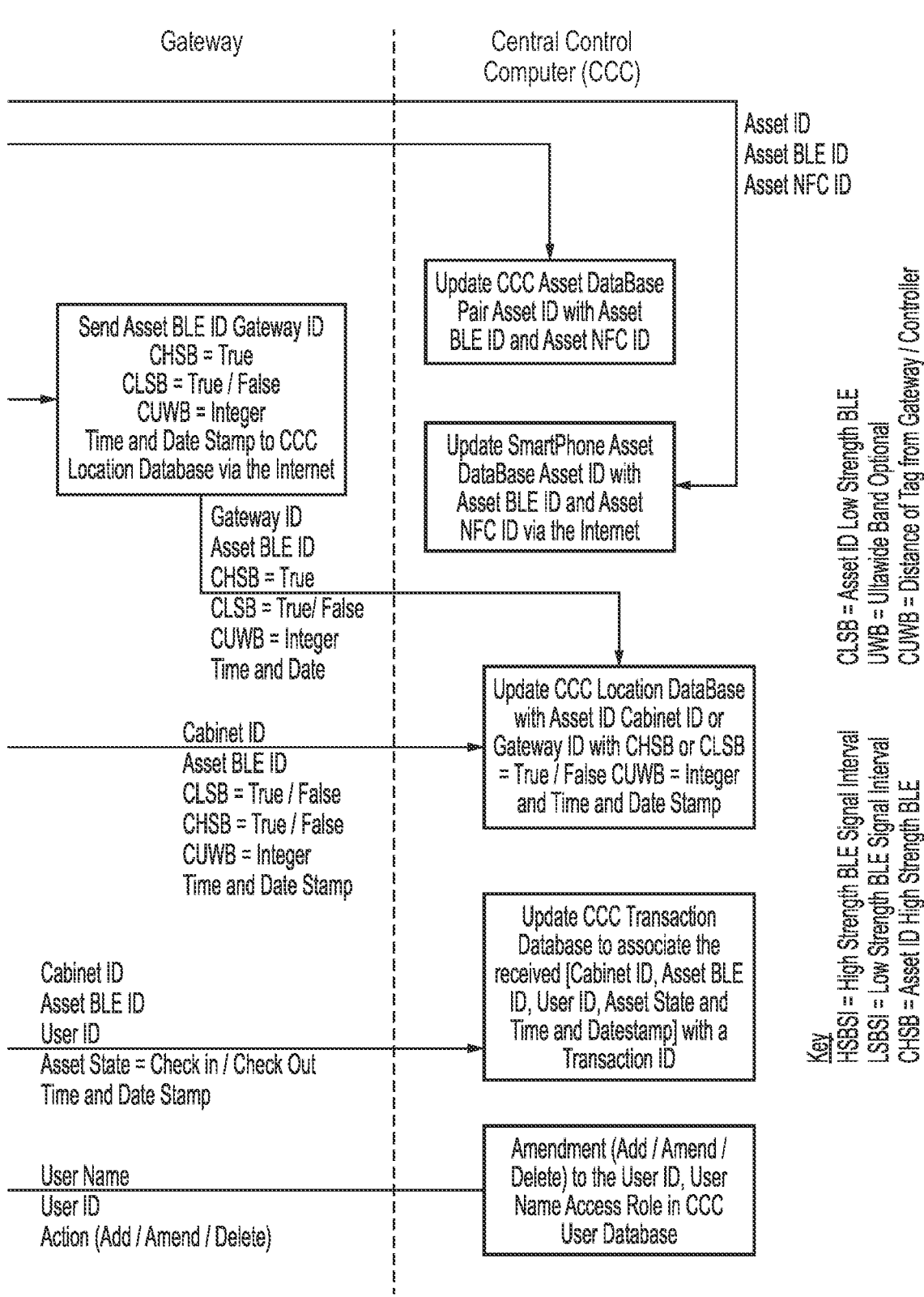

FIG. 6 is an information flow diagram illustrating the flow of messages/information in the embodiment of FIGS. 5(*a*) to 5(*f*).

Asset Tag—Determining Assets Removed From or Added to a Cabinet by a User

Figure 7:
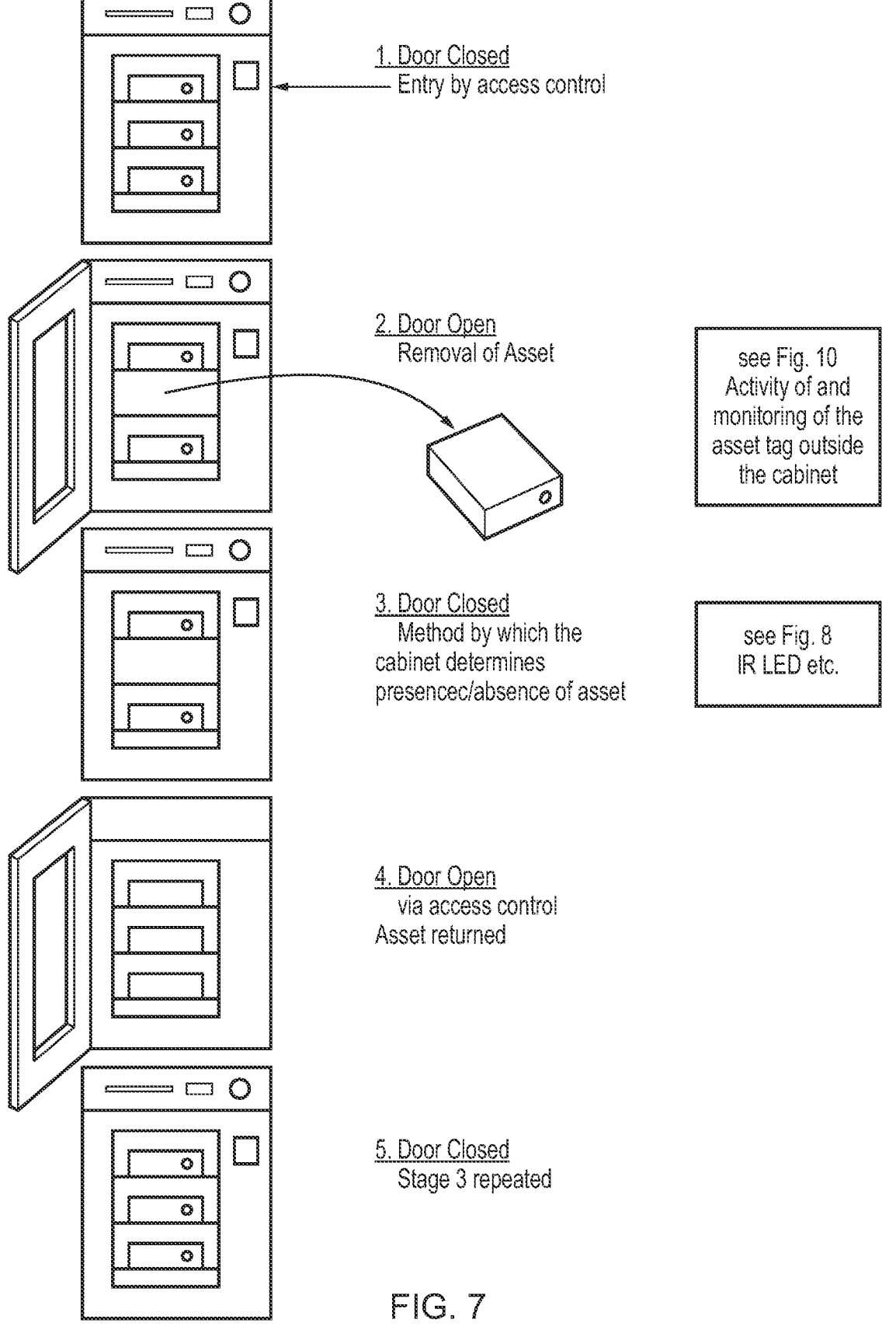
FIG. 7 schematically shows the steps involved in determining the presence or absence of an asset having an asset tag of FIGS. 4(*a*) and 4(*b*) mounted thereto in relation to the cabinet or monitoring activity of the asset when removed from the cabinet of FIGS. 2(*a*) to 2(*h*) by a user, in an embodiment.

FIG. 7 schematically shows the steps involved in determining the presence or absence of an asset having an asset tag of FIGS. 4(*a*) and 4(*b*) mounted thereto in relation to the cabinet or monitoring activity of the asset when removed from the cabinet of FIGS. 2(*a*) to 2(*h*) by a user, in an embodiment.

Figure 8:
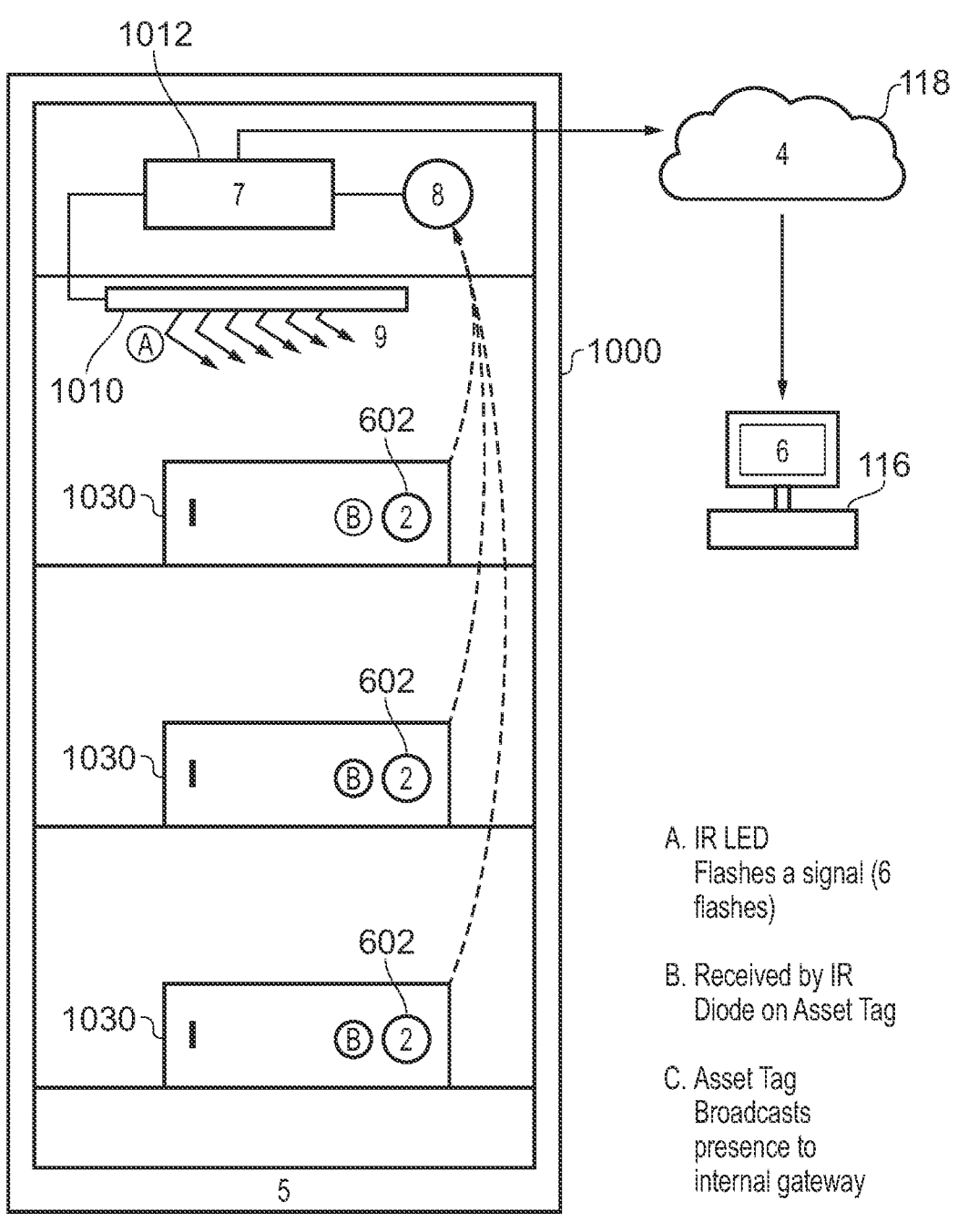
FIG. 8 schematically shows operations by which the cabinet of FIGS. 2(*a*) to 2(*h*) may determine the presence therein or absence of the asset tag of FIGS. 4(*a*) and 4(*b*), for example using optical signalling techniques.

FIG. 8 schematically shows operations by which the cabinet of FIGS. 2(*a*) to 2(*h*) may determine the presence therein or absence of the asset tag of FIGS. 4(*a*) and 4(*b*), for example using optical signalling techniques.

FIG. 9 shows the operations performed at the asset tag 602, cabinet controller 1012—(internal) gateway and central control computer (cloud-based software) 116 in a process for determining assets removed from or added to a cabinet by a user, in the embodiment of FIG. 8.

In the illustrated processes, not all steps may be essential, and it will be appreciated that one or more of the steps may be performed in a different order. Each step has an 's' as a suffix.

In an embodiment, the is asset tag 602 operable in one some or all of the modes in Table 1.

TABLE 1

| Mode 1 (dormant) | Mode 2 (heartbeat) | Mode 3 (active) | Mode 4 (tracking) |
|---|---|---|---|
| No IR detected No Bluetooth beaconing at all Bluetooth is off Low power mode (sleep) | IR has been flashed 6 times Beacon (for 3 minutes) 5 times every 4 seconds Normal transmit power (Tx) (0 db) | IR has been bleached for 1 minute Beacon indefinitely 5 times every 4 seconds Normal transmit (Tx) power (0 db) | User has sent NFC command ('track') to tag via PDA Beacon indefinitely 5 times every 3 seconds High transmit (Tx) power (4 db) |

In an embodiment, at step 33, the extracted User ID may be validated against the Cabinet 1000 Cabinet controller 1012 User List.

| Cabinet controller User List | |
|---|---|
| User ID | User Name |
| 234 | John Venter |
| 24598 | David Cooke |
| 478 | Dave Small |

The steps performed at the cabinet controller 1012 (FIG. 2(*b*)) may comprise: s902: Detect access operation (e.g., using door sensor 1008); s904: Extract User ID due to user swiping card or entering pin number on touchscreen to access; s906: Detect door closure (e.g., using door sensor 1008); and s908: Emit 6 IR flashes (e.g., using I/R emitter 1010). Although the optical signal may comprise 6 pulses of IR, any suitable number of pulses may be used (e.g., 2-10, or 4 to 8).

The steps performed at the asset tag 602 (FIGS. 4(*a*) and 4(*b*)) may comprise: s910: Detect 6 IR flashes; and s912:

Enter Mode 2 (for, e.g., 3 minutes). Although the period may comprise 3 minutes, any suitable period may be used (e.g., 1-5, or 2 to 4 minutes).

The steps performed at the cabinet controller 1012 (FIG. 2(*b*)) may then comprise: s914: Receive beacon signal from tag via BLE; s916: Extract Tag ID from received beacon signal; s918: Determine, from local asset database and a first set of Tag IDs for those tags from which beacon signal was received via BLE, a second set of Tag IDs of assets added or removed by user; and s920: Transmit activity message to CCC, including extracted user ID and associated second set of Tag IDs.

Independently of the following, the steps performed at the asset tag 602 (FIGS. 4(*a*) and 4(*b*)) may then comprise: s922: Determine that 3 minutes elapsed since tag went into Mode 2; and s924: Switch to Mode 1.

The steps performed at the central control computer (cloud-based software) 116 may then comprise: s926: Receive activity message; s928: Extract User ID and, associated therewith, second set of asset IDs; and s930: Update global asset database to add or confirm, in association with the extracted User ID, an indicator indicating that each asset having a Tag ID in the second set of Tag IDs is associated with the User ID.

In this way, the global asset database can be maintained updated, with little user intervention, as to which assets are within a given cabinet 1000.

Figure 10:
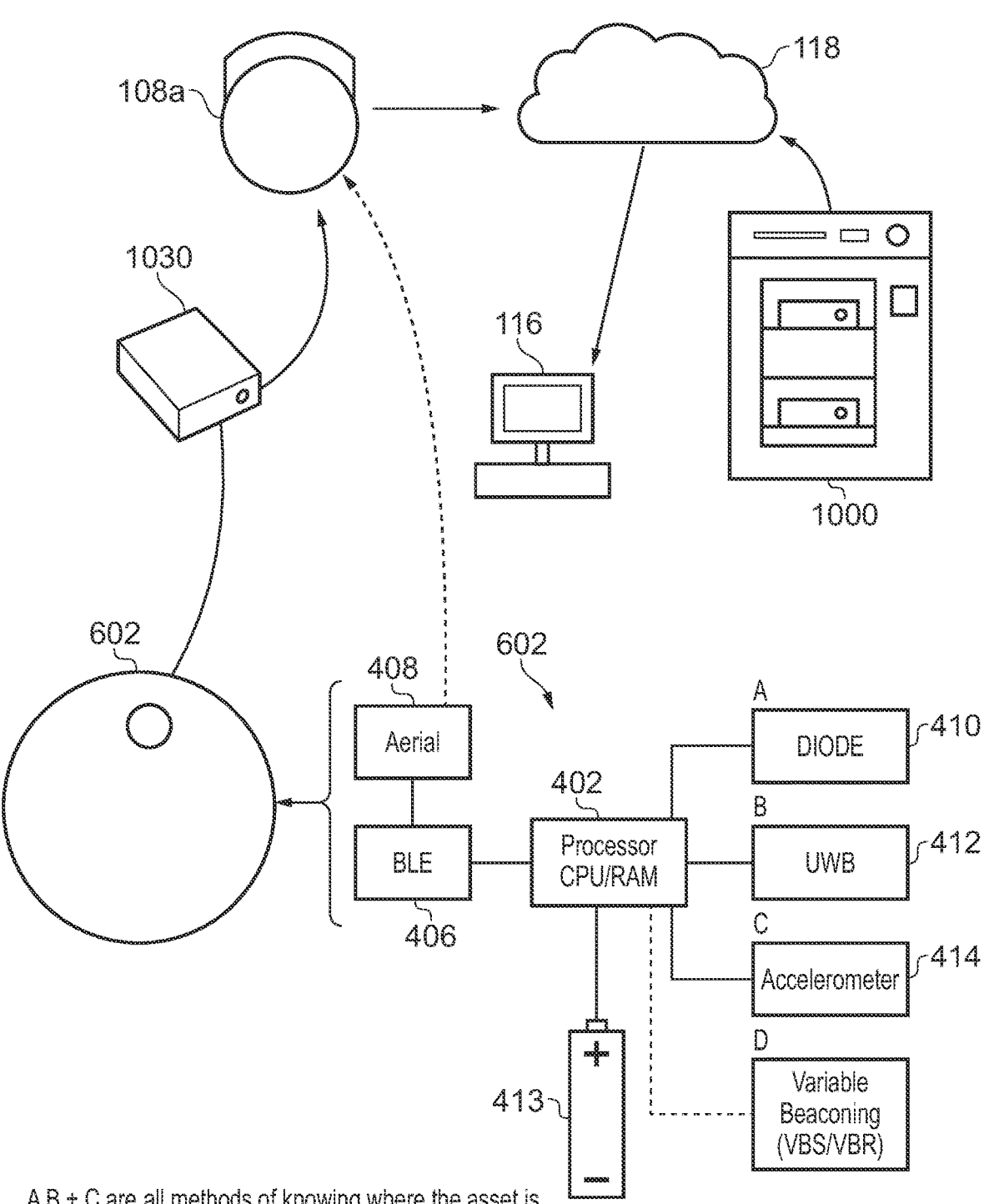

FIG. 10 schematically shows various techniques that may be used in monitoring activity and/or location of the asset tag of FIGS. 4(*a*) and 4(*b*) outside the cabinet of FIGS. 2(*a*) to 2(*h*) after removal by a user, in an embodiment.

The techniques disclosed herein afford issue and return of assets with certainty and accuracy into and out of a dispensing enclosure (cabinet) with an internal gateway utilizing, e.g., BLE and Infrared capability.

The asset tag can be attached to an asset and utilizes, e.g., BLE/Infrared in conjunction with the cabinet to provide check in/out capabilities. The user may enter the cabinet using their user ID, take their asset and close the door.

The door close event may signal for the cabinet to take an inventory check by flashing the inside of the vending unit with, e.g., IR, several times. This is received by the IR diode in the asset tag, causing the tags to beacon to let the cabinet know they're still inside.

As one asset is missing after the door close event and the signal of that tag is not being received by the cabinet, the cabinet can relay a 'transaction' (a communication containing all the specifics of the action, including user ID, date and time, and IDs of the asset tags issued/returned) to the cloud-based software indicating that the user has taken the asset that the asset tag was connected to.

In order to do this, a 'transaction' begin when the user opens the door. This transaction is initialized with the user's ID that was input (e.g., via an access control device) in order to open the door, along with the date/time of their doing so. The user takes an asset with the asset tag attached, and closes the door. At this point the IR is flashed 6 times inside the cabinet, and the asset tags that receive this signal beacon in response to alert the cabinet of their presence. The cabinet receives the signals from the tags inside the cabinet and cross-references the tag IDs with what the cabinet has in its internal database. If a tag ID is detected and the database shows that this tag was not in the cabinet during last scan (meaning its ID was not detected on the last 6 IR pulse and Bluetooth scan), then it adds this tag ID to the transaction, along with the fact that it has been "returned". It then writes the fact that it has been returned to the database.

The predetermined signal pattern (e.g., 6 IR flashes) is preferably stored in non-volatile memory on the tag. A check is done on the tag for a match with received optical signal. The tag has a "flash map" that indicates what to do upon x IR signals, including, e.g., 6 flashes: beacon in mode 2, Beaconing only in response to the optical (Infrared) signal means that power can be conserved; signal strength and beaconing rate also can be lowered to extend battery life of the tag.

If, after the Bluetooth scan has finished, it does not detect the tag ID of the assets that were previously marked in the database as being inside the cabinet, the cabinet marks these as issued in the database and put their ID in the transaction, along with the fact that it has been "issued". This full transaction is then sent to the cloud-based software via cellular or wired network connection to ensure the cloud-based software database represents that of the cabinet database.

The tag that was removed from the vending unit has now been bleached for, e.g., 1 minute; meaning it is has been receiving IR signals (due to being exposed to ambient light) consistently for a relatively long period of time (in this scenario, 1 minute). If it has not been bleached for a minute (in areas where there is no ambient IR, such as LED lit environment) outside of the cabinet, movement will have been detected using the accelerometer on the tag, and so switches to an active mode in which it beacons regularly via BLE (in an embodiment, bleaching for a period in excess of a threshold time plus detection of movement may cause switching to the active mode). This means that the asset it is lost, the user can track it using their mobile device or strategically located external gateways in order to find it (should they be in range). Once the gateway receives a beacon message from the tag, it informs the cloud-based software with a transaction containing tag ID and gateway ID. The cloud-based software then determines if it has moved, based on last location recorded in the database for this tag, and updates the PDA(s) accordingly over cellular.

The faster frequency of beaconing, when picked up by the cabinet or external gateway(s) outside the cabinet, validates that this asset is outside the cabinet.

Once the user is finished with the asset, they can enter the cabinet in the same manner as before (using their user log in) and place it back inside the cabinet. After the cabinet has done an inventory check by its internal gateway scanning the contents, it can confirm that the asset with this tag has been placed back inside (update internal database), and inform the cloud-based software accordingly.

The user is also able to move an asset from one cabinet to another, and this is tracked and recorded accurately.

This is signal-based check in/out and works quickly and efficiently for asset tracking.

In embodiments, there is the ability to track assets around the site using external gateways using a real-time location system. This involves having many strategically placed gateways around the business site such as in doorways and exits/entrances, and keeping a record on the cloud-based software database of which tags were seen and by which gateway, in the same manner as described above. Once tag is seen, gateway ID and tag ID is sent to cloud-based software, which registers the tag as under this gateway in the database. When it is picked up by a different gateway, this process is repeated for the new gateway and so on.

Referring to FIG. 10, monitoring may be done using one or more of (A) optical (diode based) sensing, (B) ultrawide band sensing and (C) sensing based upon motion sensor (e.g., accelerometer) signals, e.g., in conjunction with external gateways.

Optionally, the monitoring may be done using wireless signal (beacon) transmitted from the asset tag (e.g., BLE) that are variable in nature (VBS/VBR). For example, the (first) wireless signals may comprise composite wireless signals composed of a first component and a second component. The configuration may be such that (i) a first wireless detector of the dispensing enclosure (cabinet0 is configured to receive the first component but not the second component, when the asset tag is outside the dispensing enclosure; and (ii) optionally an external gateway is configured to generate a second indicator message in response to receipt by a short-range wireless receiver of the external gateway of the first component and/or the second component, when the asset tag is outside the dispensing enclosure. The second indicator message may include the Tag ID of the tag and a second indicator indicating that the asset tag is outside the dispensing enclosure. The (i) the first component may have a different periodicity to the second component and/or (ii) the first component may have a different transmit power to the second component and/or (iii) the first component may have a higher periodicity to the second component and/or the first component may have a higher transmit power than the second component.

(A) Optical (Diode Based) Sensing

This technique is illustrated in FIGS. 7-9.

When the door is closed, and IR is flashed 6 times inside the cabinet, all the tags stimulated via IR then beacon over Bluetooth. The cabinet controller begins a Bluetooth scan and all of the tags that it can detected with this scan are determined to be inside the cabinet. In embodiments, the BLE "scan" means enabling Bluetooth and searching specifically for predetermined Bluetooth packets (identified by unique ID formats). The beacon responses from the tags stimulated via IR signals can only be received during the scan period.

Each tag responding via Bluetooth is tied to an asset through the cloud-based software; it is determined which assets are inside the cabinet. When combined with user access code (User ID) via the door, it is determined which user has taken it.

(The cabinet ultimately determines whether the asset is in the cabinet or not. The cabinet has a database on it that stores the details of whether the asset is inside it or not. After the transaction has been sent to the CBS, the CBS database will simply replicate the structure of the cabinet database. In other words, the cabinet ultimately decides whether the asset is in the cabinet or not, and subsequently tells the CBS, which then updates the CBS database. In an embodiment, the cabinet controller keeps an updatable record of IDs of tags that are in the cabinet, and subtracts one set of IDs (after door closure) from the immediately previous set, to obtain the IDs of the tags that have been removed.)

There is no guarantee that relying on IR alone will be enough to cover all scenarios for this technique; for example, someone could place the asset down and cover the IR diode, meaning the tag won't beacon even though it is inside the cabinet.

B) Ultrawide Band Sensing

Referring to FIG. 10, the cabinet controller scans over a radius (this depends on the size of the cabinet, for example 1.5 metres from the cabinet controller; "UWB radius") from itself for UWB devices (asset tags equipped with a UWB transmitter). "Scanning" here means that the cabinet controller is performing an UWB scan to detect the tags (emitting UWB signals) that are within the defined zone (i.e., spherical space (slightly larger than the volume of the cabinet) defined by the radius. The act of performing an UWB "scan" is to initialize the hardware to receive UWB signals. Once signals are received, and their strength is analysed as being inside the radius, it is distinguishable as being inside/outside of the cabinet.

When one asset tag enters/leaves the vicinity, it is determined that it has entered/left the cabinet. Using UWB technology the Angle of Arrival (AoA) and distance of the signal received is detected in software. This is data delivered by a UWB chip (hardware) within or connected to the controller, to the controller software. The signal is then received and the distance corresponding to this signal (which is detailed upon receipt by the UWB hardware) compared with the UWB radius that has been set for this cabinet (in this example, 1.5 metres). If the determined distance is below the threshold, it is determined that the tag is inside the cabinet. If above, it is determined that the tag is outside the cabinet.

In certain scenarios, if the user shuts the door and the asset is adjacent to the cabinet (within this predetermined UWB radius), the gateway may pick up the tag outside the cabinet and assume it is inside.

(C) Sensing Based Upon Motion Sensor (e.g., Accelerometer) Signals

Referring to FIG. 10, if a tag detects that it has been moving for more than a predetermined period, e.g., 1 minute, the tag broadcasts over Bluetooth that it is moving, and strategically placed surrounding external gateways may keep track of how long it has been moving for. In addition, if the tag is not detected by the gateway inside the cabinet any longer, it is determined that the tag is outside of the cabinet.

In an embodiment, real predetermined movement threshold is used on the tag to determine that the tag is "moving". Once movement is detected on the tag for at least a predetermined period (e.g., 3 seconds), the tag alters the wireless (e.g., Bluetooth) beacon to signify it is "moving". In an embodiment, real-time accelerometer output (motion measurement) may be included in the tag's beaconing signal. This is received up by one or more nearby external gateways and used to provide an indication that the asset tag is outside the cabinet.

FIG. 11 is a flow chart of operations at an asset tag 602, a Cabinet controller 1012, an External gateway 108 and the CCC/cloud-based software 116 determining whether an asset is within or outside a dispensing enclosure 1000, in an embodiment. This can include detecting the asset tag 602 outside the cabinet, per FIG. 10. In the illustrated processes, not all steps may be essential, and it will be appreciated that one or more of the steps may be performed in a different order. Each step has an 's' as a suffix.

Optionally, the asset tag 602 continuously transmits (s1100) first wireless signals (e.g., BLE beacon) and/or second wireless signals (e.g., UWB) with predetermined periodicity and transmit power.

In another embodiment, the operations at the Cabinet controller 1012 comprise s1102: Detecting an access operation; s1104: Extracting a User ID, e.g., due to user swiping card or entering pin number on touchscreen; s1106: Detecting door closure and s1108: Emitting an optical signal (e.g., 6 IR flashes).

In this embodiment, the operations at the Asset Tag 602 comprise: s1110: Detecting the optical signal (e.g., 6 IR flashes) and s1112: transmitting (i) (e.g., per Mode 2) first wireless signals (e.g., BLE beacon) and/or (ii) second wireless signals (e.g., UWB), each with a predetermined periodicity and transmit power.

In an embodiment, the operations at the Asset Tag 602 comprise s1114: Determining that a predetermined period (e.g., 3 minutes) elapsed since tag went into Mode 2; and s1116: Switch to Mode 1 (Table 1).

In any event, the operations at the Cabinet controller 1012 comprise: s1118: receiving (i) the first wireless signals or (ii) the first wireless signals and the second wireless signals; s1120: Extracting the Tag ID from received (i) first wireless signals or (ii) first wireless signals and second wireless signals; s1122: determining, based on (i) the first wireless signals or (ii) the first wireless signals and the second wireless signals, whether the asset tag is inside or outside the dispensing enclosure; s1124: generating a first indicator message based on the determination, the first indicator message including the Tag ID, a first indicator indicating that the asset tag is one of inside and outside the dispensing enclosure, and optionally an enclosure ID; and s1126: transmitting the first indicator message to the central control computer.

Optionally, the operations at the Cabinet controller 1012 comprise: s1128: Updating local asset database to add or confirm, in association with the extracted tag ID, an indicator indicating that asset within cabinet; and: s1130: Transmitting an asset log update message to CCC, asset log update including cabinet ID and associated set of asset IDs for those tags from which beacon signal was received via BLE.

Optionally, signals are received and processed at the External gateway 108. In this embodiment, the operations at the External gateway 108 may comprise: s1140: receive the first wireless signals; s1142: determine from the first wireless signals whether the asset tag is in motion; s1144: if it is determined that the asset tag has been in motion for more than a second predetermined period, generate a second indicator message based on the determination, the second indicator message including the Tag ID, a second indicator indicating that the asset tag is outside the dispensing enclosure; s1146: transmit the second indicator message to the central control computer.

In an embodiment, the operations at the CCC/cloud-based software 116 may comprise: s1150: receiving the first indicator message from the dispensing enclosure; s1152: extracting the first indicator from the first indicator message; s1154: optionally receiving the second indicator message from the external gateway; s1156: optionally extracting the second indicator from the second indicator message; and s1158: updating an asset database to record whether or confirm that the asset is in the dispensing enclosure and/or associated with a user based upon an operation upon a combination of the first indicator and optionally the second indicator.

Optionally, the operations at the CCC/cloud-based software 116 comprise: s1160: Updating a global asset database to add or confirm, in association with the extracted cabinet ID, an indicator indicating that asset is within cabinet associated with the cabinet ID.

With such techniques, the distinct signals (components) enable monitoring by different respective (receiver) devices (cabinet controller 1012 and external gateway 108), enabling/facilitating tracking of the location of the asset to which the asset tag is attached when inside a dispensing enclosure or outside and in motion.

While embodiments have been described by reference to embodiments of stock monitoring systems having various components in their respective implementations, it will be appreciated that other embodiments make use of other combinations and permutations of these and other components.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms "comprising", "comprised of" or "which comprises" is an open term that means including at least the elements/features that follow, but not excluding others. Thus, the term "comprising", when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means including at least the elements/features that follow the term, but not excluding others. Thus, "including" is synonymous with and means "comprising".

Similarly, it is to be noticed that the term "coupled", when used in the claims, should not be interpreted as being limitative to direct connections only. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other. For example, in the context of airflow, where an outlet of A is coupled to an inlet of B it may be that one or more additional devices are provided between the outlet of A and the inlet of B.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

There are additionally provided the following.

V1. An asset monitoring system, for monitoring the issue and/or return of assets from a dispensing enclosure, and/or the location of an asset, the asset monitoring system comprising the dispensing enclosure, optionally a portable wireless device, optionally a gateway and optionally a central control computer configured for communication with the dispensing enclosure, the gateway and the portable wireless device via one or more networks;

wherein the or each asset has attached thereto an asset tag, the or each asset tag comprising a first processor and, coupled thereto a short-range first wireless transmitter or transceiver configured to transmit wireless signals;

wherein the first processor is configured to (i) transmit a periodic first wireless signal with a first interval and with a first transmit power, the first wireless signal including a first ID unique to the asset tag and a first status indicator, using the first wireless transmitter, and (ii) transmit a periodic second wireless signal with a second interval and with a second transmit power, the second wireless signal including a second ID unique to the asset tag and a second status indicator, using the first wireless transmitter, wherein the second interval is larger than the first interval and the second transmit power is larger than the first transmit power; and wherein the first status indicator has a first value when the first wireless signal is transmitted with the first transmit power and the second status indicator has a first value when the second wireless signal is transmitted with the second transmit power;

wherein the dispensing enclosure comprises:

a housing, wherein the one or more assets are disposed, in use, within the housing;

a lockable door mounted on the housing, whereby the door is openable and closable by a user;

a first wireless receiver configured to receive short-range wireless signals including at least the first wireless signal and second first wireless signal;

a first network interface configured to communicate with the central control computer via the one or more networks;

a first storage device; and a controller, the controller being connected to the first wireless receiver, the first network interface and to the first storage device;

wherein the controller is configured to receive (i) the first wireless signal or (ii) the first wireless signal and the second wireless signal from one or more asset tags within the housing;

for the or each received first and/or second wireless signal, extract (i) the respective first ID and the current first status indicator or (ii) the respective first ID and the current first status indicator and the respective second ID and the current second status indicator;

retrieve from the first storage device (i)

a respective previous first status indicator associated with the first ID or (ii) a respective previous first status indicator and previous second status indicator associated with the first ID and second ID, respectively;

determine whether there has been any change (i) from previous first status indicator to the first status indicator and optionally (ii) from previous second status indicator to the second status indicator;

if there has been a change, acquire a User ID of an active user of the dispensing enclosure;

if the change from previous first status indicator to the first status indicator is a change from a second value to the first value, store a first transaction in the first storage device, the first transaction including, associated with the first ID, the acquired User ID and an asset state indicator indicating that the asset corresponding to the first ID has been removed by the active user;

if the change from previous first status indicator to the first status indicator is a change from the first value to the second value, store a second transaction in the first storage device, the second transaction including, associated with the first ID, the acquired User ID and an asset state indicator indicating that the asset corresponding to the first ID has been returned by the active user.

V2. The asset monitoring system of paragraph V1, wherein:

the or each asset tag further comprises a short-range second transmitter or transceiver, coupled to the first processor, and configured to transmit third wireless signals using a different signal type or protocol to the first wireless transmitter or transceiver;

the controller includes or is connected to a second wireless receiver configured to receive the third wireless signals;

the first processor is configured to (i) transmit a periodic third wireless signal with a third interval and with a third transmit power, the third wireless signal including a third ID unique to the asset tag;

wherein the controller is configured to prior to or simultaneously with receiving (i) the first wireless signal or (ii) the first wireless signal and the second wireless signal, receive the third wireless signal from one or more asset tags within the housing;

for the or each received third wireless signal,
extract (i) a respective third ID;
determine, based on the received signal strength of the received third wireless signal and the predetermined third transmit power, a tag distance value indicating a distance to the tag from the second wireless receiver;
determine whether the tag distance value is (i) greater than or (ii) less than or equal to a predetermined distance threshold; and
if the tag distance value is (i) greater than the predetermined distance threshold, set the current second status indicator to the first value, and optionally set the current first status indicator to the second value;
if the tag distance value is (i) less than or equal to the predetermined distance threshold, set the current first status indicator to the first value, and optionally set the current the second status indicator to the second value; and
store in the first storage device (i) the set current first status indicator and/or the set current second status indicator and optionally (ii) the tag distance value, in association with the first, second or third ID.

V3. The asset tag for use in the system of paragraph V1, the asset tag comprising:

a first processor and, coupled thereto, a short-range first wireless transmitter configured to transmit wireless signals;

wherein the first processor is configured to transmit (i) transmit a periodic first wireless signal with a first interval and with a first transmit power, the first wireless signal including a first ID unique to the asset tag and a first status indicator, using the first wireless transmitter, and (ii) transmit a periodic second wireless signal with a second interval and with a second transmit power, the first second wireless signal including a second ID unique to the asset tag and a second status indicator, using the first wireless transmitter, wherein the second interval is larger than the first interval and the second transmit power is larger than the first transmit power; and wherein the first status indicator has a first value of when the first wireless signal is transmitted with the first transmit power and the second status indicator has a first value of when the second wireless signal is transmitted with the second transmit power.

V4. The asset tag of paragraph V3, further comprising:

a short-range second transmitter or transceiver, coupled to the first processor, and configured to transmit third wireless signals using a different signal type or protocol to the first wireless transmitter or transceiver;

wherein the first processor is configured to transmit a periodic third wireless signal with a third interval and with a predetermined third transmit power, the third wireless signal including a third ID unique to the asset tag.

V5. The asset tag of paragraph V3 or V4, further comprising:

a short-range third transceiver, coupled to the first processor, and configured to transmit fourth wireless signals using a different signal type or protocol to the first wireless transmitter or transceiver and/or the second transmitter or transceiver;

wherein the first processor is configured to:

in response to the portable wireless device being tapped or placed in proximity to the third transceiver, transmit (i) the first ID and/or the second ID, and optionally (iii) a fourth ID of the third transceiver;

receive a write signal from the portable wireless device, the write signal including a new first interval and/or a new second interval;

setting, in a non-volatile memory of the asset tag, the respective stored first interval and/or second interval to the new first interval and new second interval.

V6. The asset tag of paragraph V3, V4 or V5, wherein (i) the first ID and the second ID are identical (ii) all of the first ID, the second ID and the third ID are the same and/or the third interval is equal to the first interval or the second interval.

V7. The asset tag of any of paragraphs V3 to V6, wherein (i) the first wireless transmitter or transceiver comprises a Bluetooth Low Energy, BLE, transmitter or transceiver and (ii) the first ID and/or the second ID comprise the BLE ID of the BLE transmitter or transceiver or wherein (iii) the second transmitter or transceiver comprises a UWB transmitter or transceiver and/or (iv) the third transceiver comprises a NFC transceiver.

V8. The asset tag of any of paragraphs V3 to V7, wherein (i) the first transmit power corresponds to a range of up to 0.5 m and/or the second transmit power corresponds to a range of 0.5 m to 80 m.

V9. The dispensing enclosure for use in the system of paragraph V1, the dispensing enclosure comprising:

a housing, wherein the one or more assets are disposed, in use, within the housing;

a lockable door mounted on the housing, whereby the door is openable and closable by a user;

a first wireless receiver configured to receive short-range wireless signals including at least the first wireless signal and second first wireless signal;

a first network interface configured to communicate with the central control computer via the one or more networks;

a first storage device; and a controller, the controller being connected to the first wireless receiver, the first network interface and to the first storage device;

wherein the controller is configured to

A. receive (i) the first wireless signal or (ii) the first wireless signal and the second wireless signal from one or more asset tags within the housing;

for the or each received first and/or second wireless signal,

B. extract (i) the respective first ID and the current first status indicator or (ii) the respective first ID and the current first status indicator and the respective second ID and the current second status indicator;

C. retrieve from the first storage device (i) a respective previous first status indicator associated with the first ID or (ii) a respective previous first status indicator and previous second status indicator associated with the first ID and/or second ID, respectively;

D. determine whether there has been any change (i) from previous first status indicator to the first status indicator and optionally (ii) from previous second status indicator to the second status indicator;

E. if there has been a change, acquire a User ID of an active user of the dispensing enclosure;

F. if the change from previous first status indicator to the first status indicator is a change from a second value to the first value, store a first transaction in the first storage device, the first transaction including, associated with the first ID, the acquired User ID and an asset state indicator indicating that the asset corresponding to the first ID has been removed by the active user;

G. if the change from previous first status indicator to the first status indicator is a change from the first value to the second value, store a second transaction in the first storage device, the second transaction including, associated with the second ID, the acquired User ID and an asset state indicator indicating that the asset corresponding to the first ID has been returned by the active user.

V10. The dispensing enclosure of paragraph V9, wherein:

the controller includes or is connected to a second wireless receiver configured to receive the third wireless signals; and the controller is configured to prior to or simultaneously with receiving (i) the first wireless signal or (ii) the first wireless signal and the second wireless signal, receive the third wireless signal from one or more asset tags within the housing;

for the or each received third wireless signal, extract (i) a respective third ID;

determine, based on the received signal strength of the received third wireless signal and the predetermined third transmit power, a tag distance value indicating a distance to the tag from the second wireless receiver;

determine whether the tag distance value is (i) greater than or (ii) less than or equal to a predetermined distance threshold; and if the tag distance value is (i) greater than the predetermined distance threshold, set the current second status indicator to the first value, and optionally set the current first status indicator to the second value;

if the tag distance value is (i) less than or equal to the predetermined distance threshold, set the current first status indicator to the first value, and optionally set the current the second status indicator to the second value; and store in the first storage device (i) the set current first status indicator and/or the set current second status indicator and optionally (ii) the tag distance value, in association with the first, second or third ID.

V11. The dispensing enclosure of paragraph V9 or V10, wherein:

in a case where the second wireless signal but not the first wireless signal is received via the first wireless receiver, the controller is configured to:

set the current first status indicator to the second value and set the current second status indicator to the first value; and store in the first storage device (i) the set current first status indicator and/or (ii) the set current second status indicator in association with the first ID and second ID, respectively, and optionally (iii) the tag distance value, in association with the third ID.

V12. The dispensing enclosure of paragraph V9, V10 or V11, wherein acquiring a User ID of an active user of the dispensing enclosure comprises retrieving from the first storage device the User ID of the user that last validly accessed the dispensing enclosure.

V13. The dispensing enclosure of paragraph V9, V10 or V11, wherein acquiring a User ID of an active user of the dispensing enclosure comprises:

detecting a user input received from a new user at an access device of the dispensing enclosure, the access device coupled to the controller, the user input received from the new user including a new user ID;

determine whether access to the dispensing enclosure is granted based on the new user ID;

if access is granted, setting the new user ID as the User ID of an active user and awaiting signals from a door sensor of the dispensing enclosure; and in response to receipt from the door sensor of a door close signal following a door open signal, repeating the steps A. to G.

V14. The gateway for use in the system of paragraph V1 or V2 or in combination with the asset tag of any of paragraphs 3 to 8, the gateway comprising a second processor and, coupled thereto, a second network interface configured to communicate with the central control computer via the one or more networks, a short-range third wireless receiver configured to receive wireless signals and a non-volatile second storage device, a gateway ID unique to the gateway being stored in the second storage device;

wherein the second processor is configured to:

receive the second wireless signal from an asset tag;

extract the second ID and the second status indicator from the second wireless signal;

transmit an asset reporting message to the central control computer, the asset reporting message comprising (i) the second ID and (ii) the gateway ID and optionally (iii) the second status indicator and optionally (iv) a time and date-stamp.

V15. The gateway of paragraph V14, further including a short-range fourth wireless receiver configured to the third wireless signals, the fourth wireless receiver using a different signal type or protocol to the second receiver;

wherein the second processor is configured to:

prior to or simultaneously with receiving the second wireless signal, receive the third wireless signal from an asset tag;

extract (i) a respective third ID;

determine, based on the received signal strength of the received third wireless signal and the predetermined third transmit power, a tag distance value indicating a distance to the tag from the fourth wireless receiver; and transmit the asset reporting message to the central control computer so as to include the tag distance value.

V16. The portable wireless device for use in the system of paragraph V1 or V2 or in combination with the asset tag of any of paragraphs V3 to V8, wherein the portable wireless device comprises:

a first memory configured for storage of programs and data;

a display configured for displaying graphical data;

an input device configured to receive user inputs;

a short-range fourth transceiver configured for wireless communication with the third transceiver when placed in proximity thereto by a user of the portable wireless device; and a third processor, the first memory, display, input device and fourth transceiver being connected to the second processor;

wherein the third processor is configured to:

receive one or more user inputs selecting a new first interval and/or a new second interval;

in response to the portable wireless device being tapped or placed in proximity to the third transceiver, receive (i) the first ID and/or the second ID, and optionally (iii) a fourth ID of the third transceiver; and transmit a write signal from the portable wireless device, the write signal including the new first interval and/or the new second interval.

With systems according to paras V1 to V16, the distinct signals (components) enable monitoring by different respective (receiver) devices, enabling/facilitating tracking of the location of the asset to which the asset tag is attached when inside a dispensing enclosure or outside and in motion.

There are additionally provided the following.

M1. A system for determining whether as asset is within a dispensing enclosure, the asset having mounted thereto an asset tag, the system comprising:

the dispensing enclosure, the dispensing enclosure including a controller and, coupled thereto, a first long-range communications transceiver and (i) a first wireless detector or (ii) a first wireless detector and a second wireless detector;

optionally one or more external gateways external to the dispensing enclosure, each external gateway having a short-range wireless receiver and long-range communications transceiver;

a central control computer, the central control computer being configured for communication with the dispensing enclosure and optionally with the one or more external gateways via one or more networks;

wherein the asset tag is encoded with a Tag ID unique to the asset tag and comprises one or more short-range wireless transmitters, including (i) a first short-range wireless transmitter configured to transmit first wireless signals or (ii) a first short-range wireless transmitter and a second short-range wireless transmitter configured to transmit, respectively, first wireless signals and second wireless signals, wherein the first wireless signals optionally include motion data obtained by a motion sensing device on the asset tag;

wherein, optionally, for the or each external gateway, a processor thereof is configured to receive the first wireless signals;

determine from the first wireless signals whether the asset tag is in motion;

if it is determined that the asset tag has been in motion for more than a second predetermined period, generate a second indicator message based on the determination, the second indicator message including the Tag ID, a second indicator indicating that the asset tag is outside the dispensing enclosure; and transmit the second indicator message to the central control computer;

wherein the controller of the dispensing enclosure is configured to:

determine, based on (i) the first wireless signals or (ii) the first wireless signals and the second wireless signals, whether the asset tag is inside or outside the dispensing enclosure;

generate a first indicator message based on the determination, the first indicator message including the Tag ID, a first indicator indicating that the asset tag is one of inside and outside the dispensing enclosure, and optionally an enclosure ID; and transmit the first indicator message to the central control computer;

wherein the central control computer is configured to:

receive the first indicator message from the dispensing enclosure;

extract the first indicator from the first indicator message;

optionally receive the second indicator message from the external gateway;

optionally extract the second indicator from the second indicator message; and update an asset database to record whether or confirm that the asset is in the dispensing enclosure and/or associated with a user based upon an operation upon a combination of the first indicator and optionally the second indicator.

M2. The system of paragraph M1, wherein, if the first indicator indicates that the asset tag is outside the dispensing enclosure, the first indicator message further includes a User ID, the User ID being an ID extracted by an access control device of the dispensing enclosure since the last determination by the controller that the asset tag is inside the dispensing enclosure.

M3. The system of paragraph M2, wherein the central control computer is further configured to:

extract the User ID from the first indicator message; and update an asset database to record whether or confirm that the asset is outside the dispensing enclosure and associated with a user corresponding to the User ID.

M4. The system of any of paragraphs M1 to M3, wherein the first wireless signals and the second wireless signals are based upon different short-range wireless protocols.

M5. The system of any of paragraphs M1 to M4, wherein the dispensing enclosure comprises an optical transmitter coupled to the controller, and wherein:

determining whether the asset tag is inside or outside the dispensing enclosure comprises determining whether the first wireless signals were received within a first predetermined period of the transmission by the optical transmitter of a first optical signal, thereby generating a first intermediate indicator; and generating the first indicator message comprises using the first intermediate indicator as the first indicator in the first indicator message.

M6. The system of any of paragraphs M1 to M5, wherein the dispensing enclosure further comprises an ultra-wide band, UWB, receiver and a memory, each coupled to the controller, and wherein:

determining whether the asset tag is inside or outside the dispensing enclosure comprises determining the received signal strength of the second wireless signals;

retrieving from the memory the 3-D position within the cabinet of the UWB receiver; and determining based on the received signal strength and the retrieved 3-D position whether the asset tag is inside or outside the dispensing enclosure, thereby generating a second intermediate indicator; and generating the first indicator message comprises using the second intermediate indicator as the first indicator in the first indicator message.

M7. The system of paragraph M6, wherein the dispensing enclosure comprises both first short-range wireless transmitter and a second short-range wireless transmitter, and wherein:

generating the first indicator message comprises:

receiving the first intermediate indicator and the second intermediate indicator; and determining the first indicator based on a combination of the first intermediate indicator and the second intermediate indicator.

M8. The system of any of paragraphs M1 to M7, wherein the first wireless signals comprise composite wireless signals composed of a first component and a second component; wherein (i) the first wireless detector of the dispensing enclosure is configured to receive the first component but not the second component, when the asset tag is outside the dispensing enclosure; and (ii) optionally the external gateway is configured to generate a second indicator message in response to receipt by the short-range wireless receiver of the external gateway of the first component and/or the second component, when the asset tag is outside the dispensing enclosure.

M9. The system of paragraph M8, wherein (i) the first component has a different periodicity to the second component and/or (ii) the first component has a different transmit power to the second component and/or (iii) the first component has a higher periodicity to the second component and/or the first component has a higher transmit power than the second component.

M10. A dispensing enclosure for use in the system of any of paragraphs M1 to M9, the dispensing enclosure comprising:

a controller and, coupled thereto, a first long-range communications transceiver (i) a first wireless detector or (ii) a first wireless detector and a second wireless detector;

wherein the controller of the dispensing enclosure is configured to:

determine, based on (i) the first wireless signals or (ii) the first wireless signals and the second wireless signals, whether the asset tag is inside or outside the dispensing enclosure;

generate a first indicator message based on the determination, the first indicator message including the Tag ID, a first indicator indicating that the asset tag is one of inside and outside the dispensing enclosure, and optionally an enclosure ID; and transmit the first indicator message to the central control computer.

M11. An asset tag for use in the system of any of paragraphs M1 to M9, the asset tag being adapted to be mounted to an asset, the asset tag comprising:

a memory device, the memory device being encoded with a Tag ID unique to the asset tag; and one or more short-range wireless transmitters, including (i) a first short-range wireless transmitter configured to transmit first wireless signals or (ii) a first short-range wireless transmitter and a second short-range wireless transmitter configured to transmit, respectively, first wireless signals and second wireless signals; and a first processor, coupled to the memory device and to the one or more short-range wireless transmitters;

wherein the first processor is configured to control the transmission of the first wireless signals and the second wireless signals by the first short-range wireless transmitter and a second short-range wireless transmitter, respectively; and wherein, optionally, the first wireless signals and the second wireless signals are based upon different short-range wireless protocols.

M12. The asset tag of paragraph M11, further comprising an optical detector, wherein the first processor is configured to:

receive the first optical signal; and in response to the first optical signal, transmit the first wireless signals using the first short-range wireless transmitter.

M13. The asset tag of paragraph M11 or M12, wherein (i) the first wireless transmitter comprises a Bluetooth Low Energy, BLE, transmitter and/or (ii) the second short-range wireless transmitter comprises an ultra-wide band, UWB, transmitter, and/or wherein the first processor is configured to:

periodically or on demand, transmit the first wireless signals using the first wireless transmitter and/or transmit the second wireless signals using the second wireless transmitter.

M14. A central control computer for use in the system of any of paragraphs M1 to M9, the central control computer comprising:

a memory storing an asset database, the asset database storing, for each of one or more Tag IDs, an indication of whether an asset corresponding to the Tag ID is in a dispensing enclosure or associated with a user ID of a user;

a transceiver whereby the central control computer is configured for communication with the dispensing enclosure and optionally one or more external gateways via one or more networks; and a second processor, coupled to the memory device, transceiver and to the one or more short-range wireless transmitters;

wherein the second processor is configured to:

receive the first indicator message from the dispensing enclosure;

extract the first indicator from the first indicator message;

optionally receive the second indicator message from the external gateway;

optionally extract the second indicator from the second indicator message; and update an asset database to record whether or confirm that the asset is in the dispensing enclosure and/or associated with a user based upon an operation upon a combination of the first indicator and optionally the second indicator.

M15. The system of any of paragraphs M1 to M14, wherein the operation upon a combination comprises determining that the asset is within the dispensing enclosure if it is determined that (i) one of the first indicator and the second indicator indicates that the asset is within the dispensing enclosure or (ii) both of the first indicator and the second indicator indicates that the asset is within the dispensing enclosure.

With systems according to paras M1 to M15, the distinct signals (components) enable monitoring by different respective (receiver) devices, enabling/facilitating tracking of the location of the asset to which the asset tag is attached when inside a dispensing enclosure or outside and in motion.

There are additionally provided the following.

N1. An asset tag adapted to be mounted to an asset, wherein the asset tag is encoded with a Tag ID unique to the asset tag and comprises one or more short-range wireless transmitters, including (i) a first short-range wireless transmitter configured to transmit first wireless signals or (ii) a first short-range wireless transmitter and a second short-range wireless transmitter configured to transmit, respectively, first wireless signals and second wireless signals, wherein the first wireless signals;

wherein the first wireless signals comprise composite wireless signals composed of a first component and a second component; and wherein (i) the first component has a different periodicity to the second component and/or (ii) the first component has a different transmit power to the second component and/or (iii) the first component has a higher periodicity to the second component and/or the first component has a higher transmit power than the second component.

N2. The asset tag of paragraph N1, wherein the first short-range wireless transmitter comprises a Bluetooth Low Energy, BLE, transmitter and/or the second short-range wireless transmitter comprises an ultra-wideband, UWB, transmitter N3. The asset tag of paragraph N1 or N2, wherein the one or more short-range wireless transmitters including a short-range wireless transceiver.

N4. The asset tag of paragraph N3, wherein the short-range wireless transceiver comprises an NFC transceiver.

With asset tags according to paras N1 to N4, the distinct signals (components) enable monitoring by different respective (receiver) devices, enabling/facilitating tracking of the location of the asset to which the asset tag is attached when inside a dispensing enclosure or outside and in motion.

There are additionally provided the following.

O. An asset tag adapted to be mounted to an asset, wherein the asset tag is encoded with a Tag ID unique to the asset tag, the asset tag comprising:

a non-volatile memory, a Tag ID unique to the asset tag being stored in the non-volatile memory;

one or more short-range wireless transmitters, including a short-range first wireless transmitter configured to transmit periodic first wireless signals, wherein the first wireless signals include the Tag ID, the first wireless transmitter being configured to operate in a first transmission mode and a second transmission mode, the transmit power of the first wireless signals being higher in the second transmission mode than in the first transmission mode;

a motion sensing device configured to output one or more motion signals indicative of the movement, if any, of the asset tag;

processing circuitry, wherein the non-volatile memory, the one or more short-range wireless transmitters and motion sensing device are connected to the processing circuitry; and a battery, wherein at least the first wireless transmitter, and optionally all components of the asset tag, are powered by the battery;

wherein the processing circuitry is configured to:

receive the one or more motion signals;

determine whether the asset tag is in a moving state; and if the asset tag is in the moving state, switch the first wireless transmitter from the first transmission mode to the second transmission mode.

O2. The asset tag of paragraph O1, wherein the asset tag is determined to be in the moving state if it is determined from the one or more motion signals that the asset tag has been non-stationary for a predetermined period or more.

O3. The asset tag of paragraph O2, wherein the predetermined period (i) lies in the range 1-5 seconds, (ii) lies in the range 2-4 seconds or (iii) is 3 seconds.

O4. The asset tag of paragraph O1, O2 or O3, wherein the one or more short-range wireless transmitters further include a second short-range wireless transmitter configured to transmit second wireless signals, the second wireless transmitter being configured to operate in a first transmission mode and a second transmission mode, the transmit power of the second wireless signals being higher in the second transmission mode than in the first transmission mode.

O5. The asset tag of paragraph O2, wherein the processing circuitry is configured to switch the second wireless transmitter from the first transmission mode to the second transmission mode if it is determined that the asset tag is in the moving state, O6. The asset tag of any of paragraphs O1 to O5, wherein the first wireless transmitter comprises a Bluetooth Low Energy, BLE, transmitter and/or the second wireless transmitter comprises an ultra-wideband, UWB, transmitter.

O7. The asset tag of any of paragraphs O1 to O6, wherein the one or more short-range wireless transmitters including a short-range wireless transceiver.

O7. The asset tag of paragraph O7, wherein the short-range wireless transceiver comprises an NFC transceiver.

O8. The asset tag of any of paragraphs O1 to O7, wherein the processing circuitry is configured to switch one or more further components from a sleep mode to an active mode if it is determined that the asset tag is in the moving state, the power consumption of the asset tag being higher in the active mode than in the sleep mode, With asset tags according to paras O1 to O8, it is ensured that the asset tag is in an optimal mode, so as to reduce or minimise energy consumption and thus depletion of the battery. This is done while ensuring that the asset tag is in a 'trackable' state when non-stationary—enabling/facilitating tracking of the location of the asset to which the asset tag is attached when in motion.

In addition, there may be provided the following:

W1. A dispensing enclosure for monitoring the issue and/or return of assets from the dispensing enclosure, and/or the location of an asset, the or each asset having an asset tag mounted there;

wherein the asset tag comprises a first processor and, coupled thereto, a short-range first wireless transmitter or transceiver configured to transmit wireless signals;

wherein the first processor is configured to transmit a first wireless signal with a predetermined first transmit power, the first wireless signal including a Tag ID unique to the asset tag, wherein the dispensing enclosure comprises:

a housing, wherein the one or more assets are disposed, in use, within the housing;

a lockable door mounted on the housing, whereby the door is openable and closable by a user;

a first wireless receiver configured to receive short-range wireless signals including at least the first wireless signal from one or more asset tags;

optionally a first network interface configured to communicate with the central control computer via the one or more networks;

a first storage device, the having stored therein a predetermined distance threshold and the predetermined first transmit power; and a controller, the controller being connected to the first wireless receiver, optionally the first network interface and to the first storage device;

wherein the controller is configured to for the or each received first wireless signal, extract (i) a respective Tag ID;

determine, based on the received signal strength of the received first wireless signal and the predetermined first transmit power, a tag distance value indicating a distance to the tag from the first wireless receiver;

determine whether the tag distance value is (i) greater than or (ii) less than or equal to the predetermined distance threshold; and if the tag distance value is (i) greater than a predetermined distance threshold, set an asset status indicator to a first value, indicating that the asset associated with the Tag ID is outside the dispensing enclosure;

if the tag distance value is (i) less than or equal to the predetermined distance threshold, set the asset status indicator to the second value, indicating that the asset associated with the Tag ID is inside the dispensing enclosure; and store in the first storage device (i) the set current asset status indicator and optionally (ii) the tag distance value, in association with the Tag ID.

W2. The dispensing enclosure of paragraph W1, wherein the predetermined distance threshold (i) lies in the range 1-2 m, or (ii) is 1.5 m.

W3. The asset tag adapted to be mounted to an asset, for use with the dispensing enclosure of paragraph W1 or W2, the asset tag comprising:

a first processor and, coupled thereto, a short-range first wireless transmitter or transceiver configured to transmit wireless signals;

wherein the first processor is configured to transmit the first wireless signal with a first transmit power, the first wireless signal including a first ID unique to the asset tag, using the first wireless transmitter.

W4. The asset tag of paragraph W3, wherein first wireless signal is transmitted with a first periodicity defining a first interval.

W5. The asset tag of paragraph W3 or W4, further comprising:

a short-range third transceiver, coupled to the first processor, and configured to transmit second wireless signals using a different signal type or protocol to the first wireless transmitter or transceiver;

wherein the first processor is configured to:

in response to the portable wireless device being tapped or placed in proximity to the third transceiver, transmit the Tag ID, and optionally (iii) a second ID of the second transceiver;

receive a write signal from the portable wireless device, the write signal including a new first interval and/or a new second interval;

setting, in a non-volatile memory of the asset tag, the respective stored first interval and/or second interval to the new first interval and new first transmit power.

W6. The asset tag of paragraph W3, W4 or W5, wherein (i) the Tag ID and the second ID are identical.

W7. The asset tag of any of paragraphs W3 to W6, wherein (i) the first wireless transmitter or transceiver comprises a UWB transmitter or transceiver and/or (ii) the second transceiver comprises a NFC transceiver.

W8. A gateway of for use with the asset tag of any of paragraphs W3 to W7, the gateway comprising a second processor and, coupled thereto, a second network interface configured to communicate with a central control computer via the one or more networks, a short-range second wireless receiver configured to receive the first wireless signals and a non-volatile second storage device, a gateway ID unique to the gateway and the predetermined first transmit power being stored in the second storage device;

wherein the second processor is configured to:

receive the first wireless signal from an asset tag;

extract (i) a respective Tag ID;

determine, based on the received signal strength of the received first wireless signal and the predetermined first transmit power, a tag distance value indicating a distance to the tag from the second wireless receiver; and transmit the asset reporting message to the central control computer, the asset reporting message comprising (i) the Tag ID and (ii) the gateway ID and optionally (iii) the tag distance value and optionally (iv) a time and date-stamp.

W9. The portable wireless device for in combination with the asset tag of any of paragraphs W3 to W7, wherein the portable wireless device comprises:

a first memory configured for storage of programs and data;

a display configured for displaying graphical data;

an input device configured to receive user inputs;

a short-range fourth transceiver configured for wireless communication with the third transceiver when placed in proximity thereto by a user of the portable wireless device; and a third processor, the first memory, display, input device and fourth transceiver being connected to the second processor;

wherein the third processor is configured to:

receive one or more user inputs selecting a new first interval;

in response to the portable wireless device being tapped or placed in proximity to the third transceiver, receive (i) the Tag ID and optionally (ii) a second ID of the second transceiver; and transmit a write signal from the portable wireless device, the write signal including the new first interval.

The invention claimed is:

1. A dispensing enclosure, the dispensing enclosure comprising:

a housing;

one or more assets disposed within the housing, the or each asset having an asset tag mounted thereon, the asset tag comprising:

a first short-range wireless interface configured to transmit a wireless signal with a predetermined periodicity, the wireless signals including a tag ID unique to the asset tag;

an optical sensor configured to receive optical signals and output electrical signals;

processing circuitry, coupled to the first short-range wireless interface and to the optical sensor; and a battery, wherein the first short-range wireless interface, optical sensor, and/or processing circuitry are connected to and powered by the battery;

wherein the processing circuitry is configured to receive a first electrical signal from the optical sensor in response to the receipt thereby of a first optical signal; and in response to the first electrical signal, transmit a first wireless signal including the tag ID via the first short-range wireless interface;

an access control device configured to receive a User ID through a user's authorised access to the dispensing enclosure using the access control device;

a door mounted on the housing, whereby the door is openable and closable by a user;

a door sensor configured to output a door close signal in the event of the door transitioning from open to closed;

an optical transmitter configured to transmit optical signals;

a second short-range wireless interface; and a controller, the controller being connected to the door sensor, to the optical transmitter, and to the second short-range wireless interface;

wherein the controller is configured to receive the door close signal;

in response to the door close signal, transmit the first optical signal using the optical transmitter;

for the or each asset tag within the dispensing enclosure, receive a respective first wireless signal from the asset tag via the second short-range wireless interface;

extract tag ID from each received first wireless signal;

determine, based on the extracted tag IDs, a set of tag IDs of assets added or removed by the user;

transmit an activity message to a remote central control computer, the activity message including the received User ID and, associated therewith, the set of tag IDs.

2. The dispensing enclosure of claim 1, wherein, to determine, based on the extracted tag IDs, a set of tag IDs of assets added or removed by the user, the controller is configured to determine, from a third set of tag IDs stored in a local asset database and a first set of tag IDs comprising the extracted tag IDs, the difference therebetween as a second set of tag IDs.

3. The dispensing enclosure of claim 2, wherein the set of tag IDs in the activity message comprises the second set of tag IDs.

4. The dispensing enclosure of claim 1, wherein the door sensor is further configured to output a door open signal in the event of the door transitioning from closed to open.

* * * * *